US009614987B2

(12) United States Patent
Yun

(10) Patent No.: US 9,614,987 B2
(45) Date of Patent: Apr. 4, 2017

(54) MOBILE DEVICE AND IMAGE FORMING APPARATUS FOR PROVIDING USER INTERFACE SCREEN, AND METHOD OF PROVIDING USER INTERFACE SCREEN IN THE MOBILE DEVICE AND IMAGE FORMING APPARATUS

(71) Applicant: SAMSUNG ELECTRONICS CO., LTD., Suwon-si (KR)

(72) Inventor: Tae-jung Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 93 days.

(21) Appl. No.: 14/219,370

(22) Filed: Mar. 19, 2014

(65) Prior Publication Data
US 2015/0029541 A1 Jan. 29, 2015

(30) Foreign Application Priority Data

Jul. 29, 2013 (KR) .................. 10-2013-0089830

(51) Int. Cl.
*H04N 1/00* (2006.01)
*G06K 15/00* (2006.01)
*G06F 3/12* (2006.01)
*G06F 3/14* (2006.01)

(52) U.S. Cl.
CPC ....... *H04N 1/00493* (2013.01); *G06F 3/1205* (2013.01); *G06F 3/1232* (2013.01); *G06F 3/1253* (2013.01); *G06F 3/1292* (2013.01); *G06K 15/002* (2013.01); *G06K 15/007* (2013.01); *H04N 1/00278* (2013.01); *H04N 1/00307* (2013.01); *H04N 1/00408* (2013.01); *H04N 1/00503* (2013.01); *G06F 3/1423* (2013.01); *G09G 2370/16* (2013.01)

(58) Field of Classification Search
CPC ........... H04N 1/00493; H04N 1/00307; H04N 1/00503; H04N 1/00408; H04N 1/00278; G06F 3/1292; G06F 3/1253; G06F 3/1232; G06F 3/1205; G06F 3/1423; G06K 15/002; G06K 15/007; G09G 2370/16
USPC ....................................................... 358/1.15
See application file for complete search history.

(56) References Cited

U.S. PATENT DOCUMENTS

| 7,577,910 | B1 * | 8/2009 | Husemann ............ G06F 9/4445 715/744 |
| 7,603,189 | B2 * | 10/2009 | Tanaka ............... H04N 1/00204 355/18 |
| 8,457,538 | B2 * | 6/2013 | Okamoto et al. ............ 399/304 |
| 8,531,705 | B2 * | 9/2013 | Ishikura ............. G03G 15/5075 358/1.15 |
| 2003/0167334 | A1 * | 9/2003 | Butler ..................... H04L 29/06 709/227 |
| 2006/0184614 | A1 * | 8/2006 | Baratto et al. ................ 709/203 |
| 2009/0303187 | A1 * | 12/2009 | Pallakoff ...................... 345/169 |

(Continued)

*Primary Examiner* — Kent Yip
(74) *Attorney, Agent, or Firm* — Staas & Halsey LLP

(57) ABSTRACT

A mobile device or an image forming apparatus for providing a user interface, wherein the mobile device or the image forming apparatus receives product specifications of the mobile device or the image forming apparatus via near field communication (NFC) to determine a layout of the user interface of the mobile device or the image forming apparatus, and displays the user interface having the layout determined with respect to a predetermined application before.

20 Claims, 18 Drawing Sheets

(56) References Cited

U.S. PATENT DOCUMENTS

| | | | |
|---|---|---|---|
| 2010/0268762 A1* | 10/2010 | Pahlavan et al. | 709/203 |
| 2011/0080608 A1* | 4/2011 | Do | G06F 3/04883 358/1.15 |
| 2011/0083076 A1* | 4/2011 | Kang | G06F 9/44526 715/735 |
| 2012/0144329 A1* | 6/2012 | Sasaki | G06F 3/0482 715/764 |
| 2012/0327443 A1* | 12/2012 | Fujii | 358/1.13 |
| 2013/0111238 A1* | 5/2013 | Takahashi | H04N 1/00222 713/320 |
| 2013/0125047 A1 | 5/2013 | Levin et al. | |
| 2013/0125052 A1 | 5/2013 | Baird | |
| 2013/0229673 A1* | 9/2013 | Nakayama et al. | 358/1.13 |
| 2014/0029049 A1* | 1/2014 | Takahashi | H04N 1/00973 358/1.15 |
| 2014/0155121 A1* | 6/2014 | Haba | 455/557 |

\* cited by examiner

<NFC enabled phone>

<NFC enabled phone>

NFC tag

| Item | Value |
| --- | --- |
| Device Name | CLX-4170FW |
| Serial Number | 1234567890 |
| Print Capacity | Color, Mono |
| Scan Capacity | 300, 600 dpi |
| Fax Capacity | 33.6K bps |
| Network Address 1 | 0x0000f0a01234 |
| Network Address 2 | 169.254.12.13 |
| Location | N37.578868, E126.980564 |
| Administrator | Kim Jin Hyung (010-123-1234, j.h.Kim@samsung.com) |

FIG. 13

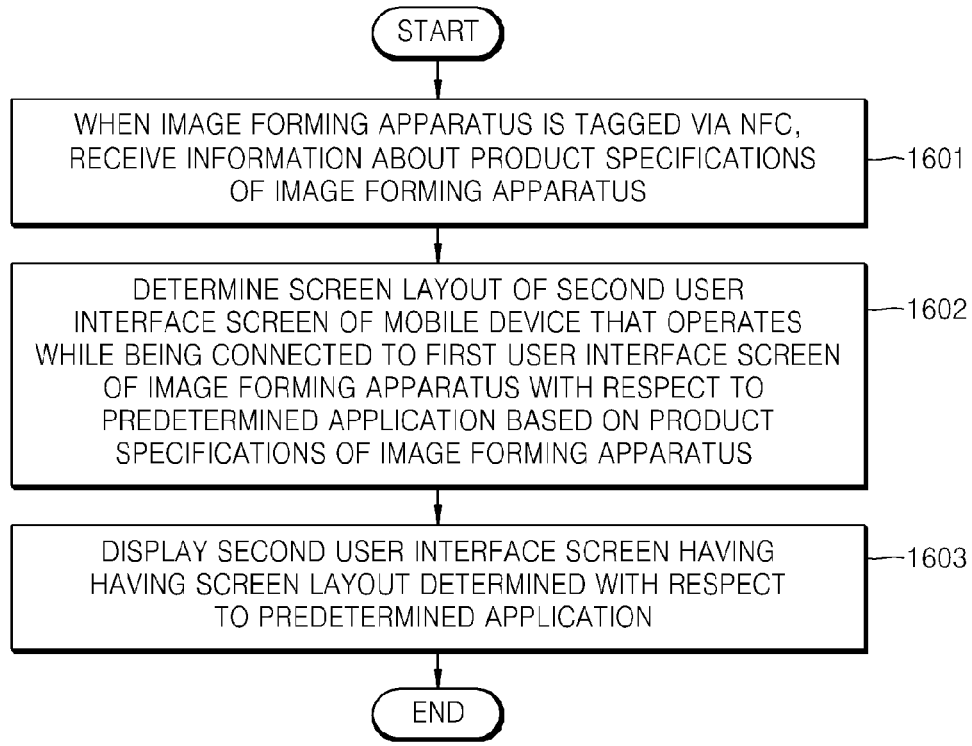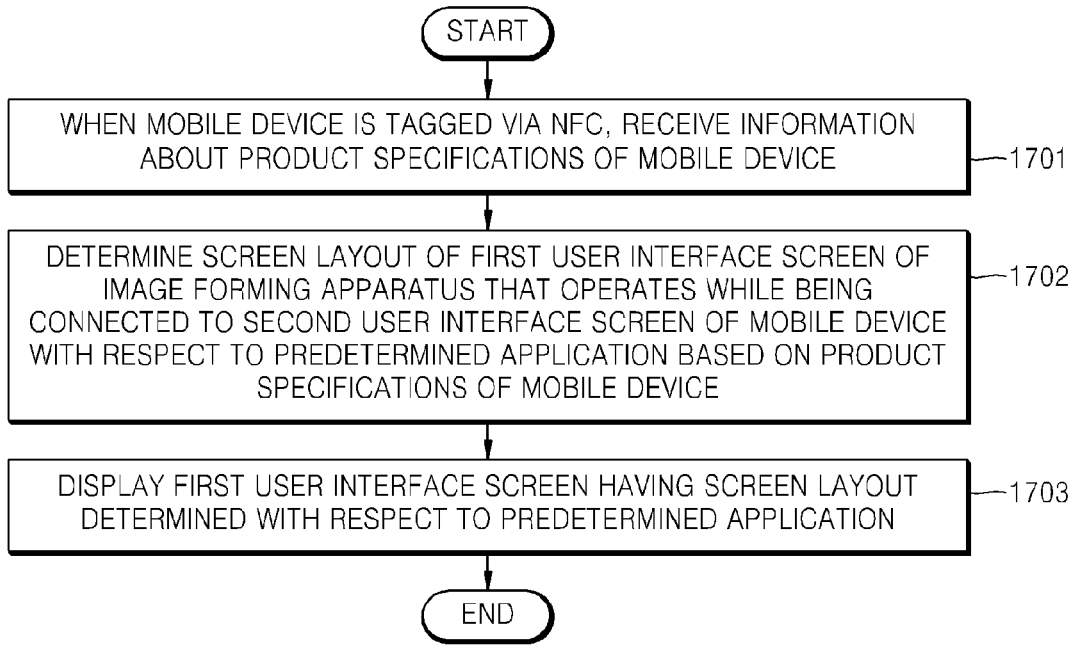

MOBILE DEVICE AND IMAGE FORMING APPARATUS FOR PROVIDING USER INTERFACE SCREEN, AND METHOD OF PROVIDING USER INTERFACE SCREEN IN THE MOBILE DEVICE AND IMAGE FORMING APPARATUS

CROSS-REFERENCE TO RELATED APPLICATIONS

This application claims the priority benefit of Korean Patent Application No. 10-2013-0089830, filed on Jul. 29, 2013, in the Korean Intellectual Property Office, the disclosure of which is incorporated herein in its entirety by reference.

BACKGROUND

1. Field

The following description relates to a mobile device and an image forming apparatus for providing a user interface, and more particularly, to a method of providing a user interface in a mobile device and an image forming apparatus.

2. Description of the Related Art

Near field communication (NFC) is a contactless short-range wireless communication standard between electronic devices within a short distance of about 10 cm, for example, with low power consumption by using a frequency of about 13.56 MHz, for example, and was developed by the joint work of NXP Semiconductors of the Netherlands and Sony of Japan in 2002. A data transfer rate of NFC is about 424 Kbps, for example, and NFC has excellent security due to high proximity and encryption technology. NFC forgoes a complicated pairing process of recognition of devices but allows devices to detect one another within about $\frac{1}{10}$ second or less, for example. In particular, NFC is a smart card type contactless wireless communication technology where radio frequency identification (RFID) technology is utilized. In addition, NFC builds upon RFID technology by allowing two-way communication compared to smart cards. NFC has a relatively large memory storage space and offers more variety of services. Accordingly, commercialized electronic devices, such as smartphones and personal computers (PCs), in which the NFC technology is used, have recently been released.

SUMMARY

One or more embodiments of the present disclosure include a mobile device and an image forming apparatus for providing a user interface, and a method of providing a user interface in a mobile device and an image forming apparatus.

One or more embodiments of the present disclosure include a computer-readable recording medium having a program for executing the method.

Additional aspects will be set forth in part in the description which follows and, in part, will be apparent from the description, or may be learned by practice of the presented embodiments.

According to one or more embodiments of the present disclosure, a mobile device for providing a user interface, includes: a near field communication (NFC) module to receive information about product specification of an image forming apparatus when the image forming apparatus is tagged via NFC; a control unit to determine a layout of a second user interface of the mobile device that operates while being linked to a first user interface of the image forming apparatus with respect to a predetermined application based on product specifications of the image forming apparatus; and a user interface unit to display the second user interface having the layout determined with respect to the predetermined application.

The control unit may determine one of the first and second interfaces as a main interface and the other as a sub-interface.

The first and second user interfaces may have different layouts.

The user interface unit may display the second user interface based on job information that is input via the first user interface.

When an activation command of an upper menu that is input via the first user interface is received via the NFC module, the user interface unit may display lower menus of the upper menu on the second user interface.

The control unit may include: a determining unit to determine a device having superior or inferior product specifications among the mobile device and the image forming apparatus by comparing product specifications of the mobile device and product specifications of the image forming apparatus; and a layout unit to determine the layout of the second user interface based on the determination result.

The determining unit may determine a device having superior or inferior product specifications by further considering a type of an application to be executed on the mobile device and the image forming apparatus and types of contents to be processed in the application, in addition to the product specifications.

The product specifications may include at least one of a display size, CPU performance, memory capacity, and hard drive capacity.

The control unit may determine a layout of the second user interface by comparing a display size of the image forming apparatus that is included in the received information with a display size of the image forming apparatus.

The control unit may execute an image job application, and the user interface unit displays, on the second user interface, menus that are not displayed on the first user interface, among menus of an upper menu and menus of a lower menu of the image job application.

The control unit may execute a text editing application, and the user interface unit displays, if a text editing window of the text editing application is not displayed on the first user interface, the text editing window on the second user interface.

The control unit may execute an application that provides contents, and the user interface unit displays, if specific contents of the application are not displayed on the first user interface, the specific contents on the second user interface.

According to one or more embodiments of the present disclosure, an image forming apparatus for providing a user interface, includes: a near field communication (NFC) module to receive information about product specification of a mobile device when the mobile device is tagged via NFC; a control unit to determine a layout of a first user interface of the image forming apparatus that operates while being linked to a second user interface of the mobile device with respect to a predetermined application based on the product specifications of the mobile device; and a user interface unit to display the first user interface having the layout determined with respect to the predetermined application.

The control unit may determine one of the first and second interfaces as a main interface and the other as a sub-interface.

The user interface unit may display the first user interface based on job information input via the second user interface.

When an activation command of an upper menu that is input via the second user interface is received via the NFC module, the user interface unit may display lower menus of the upper menu on the first user interface.

The control unit may include: a determining unit to determine a device having superior or inferior product specifications among the mobile device and the image forming apparatus by comparing product specifications of the mobile device and product specifications of the image forming apparatus; and a layout unit to determine the layout of the first user interface based on the determination result.

According to one or more embodiments of the present disclosure, a method of providing a user interface in a mobile device, includes: receiving information about product specifications of an image forming apparatus when the image forming apparatus is tagged via near field communication (NFC); determining a layout of a second user interface of the mobile device that operates while being linked to a first user interface of the image forming apparatus with respect to a predetermined application based on the product specifications of the image forming apparatus; and displaying the second user interface having the layout determined with respect to the predetermined application.

According to one or more embodiments of the present disclosure, a method of providing a user interface in an image forming apparatus, includes: receiving information about product specifications of a mobile device when the mobile device is tagged via near field communication (NFC); determining a layout of a first user interface of the image forming apparatus that operates while being linked to a second user interface of the mobile device with respect to a predetermined application based on the product specifications of the image forming apparatus; and displaying the first user interface having the layout determined with respect to the predetermined application.

According to one or more embodiments of the present disclosure, a non-transitory computer-readable recording medium having embodied thereon a program for executing the method described above is included.

BRIEF DESCRIPTION OF THE DRAWINGS

These and/or other aspects will become apparent and more readily appreciated from the following description of embodiments, taken in conjunction with the accompanying drawings in which:

FIG. 13 illustrates a mobile device and an image forming apparatus that provide an extended UI screen regarding a text editing application for editing a document received from an external server, according to another embodiment of the present disclosure;

FIG. 16 is a flowchart illustrating a method of providing an extended UI screen in a mobile device, according to an embodiment of the present disclosure; and FIG. 17 is a flowchart illustrating a method of providing an extended UI screen in an image forming apparatus, according to an embodiment of the present disclosure.

DETAILED DESCRIPTION

Figure 1A:
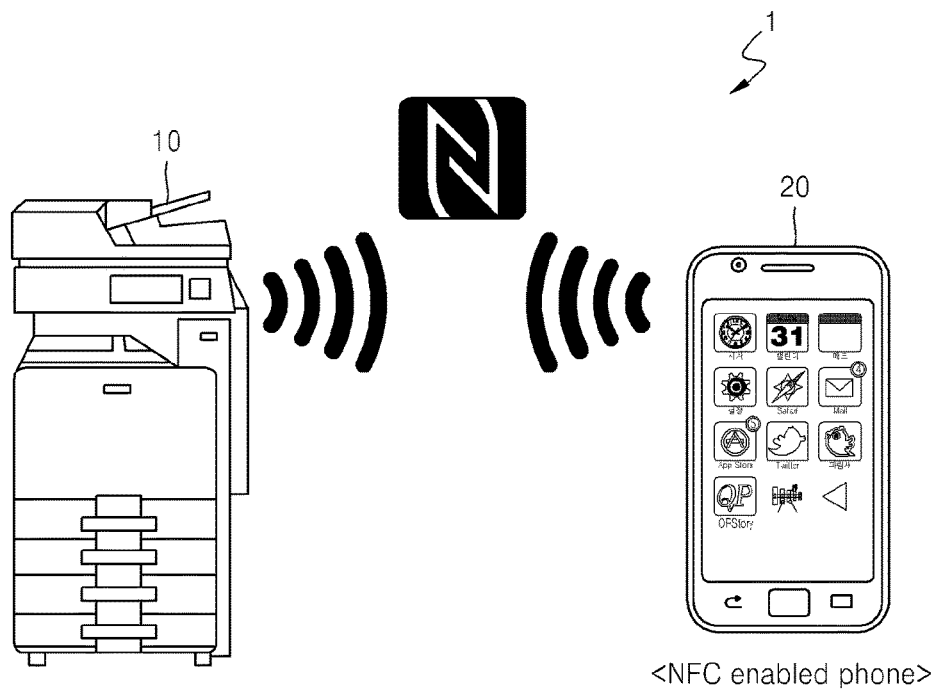
FIG. 1A illustrates a near field communication (NFC) environment according to an exemplary embodiment of the present disclosure.

Reference will now be made in detail to embodiments of the present disclosure, examples of which are illustrated in the accompanying drawings, wherein like reference numerals refer to like components throughout. Embodiments are described below in order to explain the present disclosure while referring to the figures. Expressions such as "at least one of," when preceding a list of components, modify the entire list of components and do not modify the individual components of the list.

FIG. 1A illustrates a near field communication (NFC) environment 1 according to an exemplary embodiment of the present disclosure. Referring to FIG. 1A, an image forming apparatus 10 and a mobile device 20 (such as a smartphone) each supporting an NFC function are present in the NFC environment 1. An NFC chip is embedded in the image forming apparatus 10 illustrated in FIG. 1 in advance, and thus communication between the image forming apparatus 10 and the mobile device 20 may be performed via NFC.

Figure 1B:
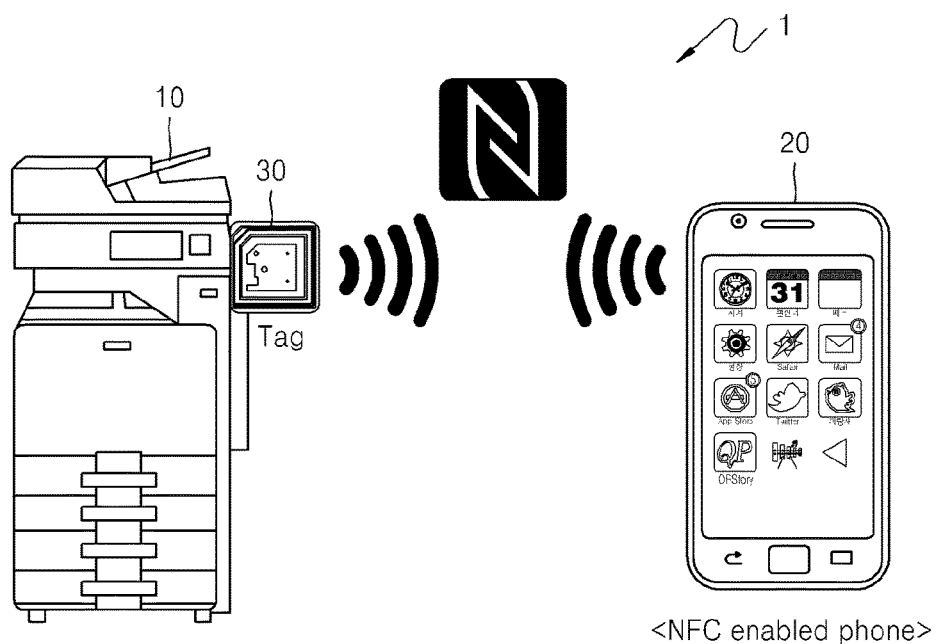
FIG. 1B illustrates an NFC environment according to another exemplary embodiment of the present disclosure.

FIG. 1B illustrates an NFC environment 1 which is similar to the NFC environment 1 of FIG. 1A, according to an exemplary embodiment of the present disclosure. Referring to FIG. 1B, an image forming apparatus 10 and a mobile device 20 each supporting an NFC function are also present in the NFC environment 1. In particular, an NFC tag 30 is embedded in advance in the image forming apparatus 10 of FIG. 1A, whereas no NFC tag 30 is embedded in the image forming apparatus 10 in FIG. 1B in advance. Accordingly, the image forming apparatus 10 of FIG. 1B may communicate with the mobile device 20 via NFC only when an NFC tag 30 is installed later in the image forming apparatus 10 of FIG. 1B.

However, it will be understood by one of ordinary skill in the art that if an NFC tag 30 is installed later in the image forming apparatus 10 of FIG. 1B, then an operation of the NFC environment 1 of the current exemplary embodiment is identical to that of the NFC environment 1 of FIG. 1A, in which the NFC tag 30 is embedded in advance.

While just one pair of devices, that is, the image forming apparatus 10 and the mobile device 20, is present in the NFC environment 1 illustrated in FIGS. 1A and 1B for convenience of description, more electronic devices of different types that support an NFC function may also be present in the NFC environment 1. These devices may also operate in the same manner of NFC as in the current exemplary embodiment of the present disclosure, which would be understood by one of ordinary skill in the art.

Figure 1C:
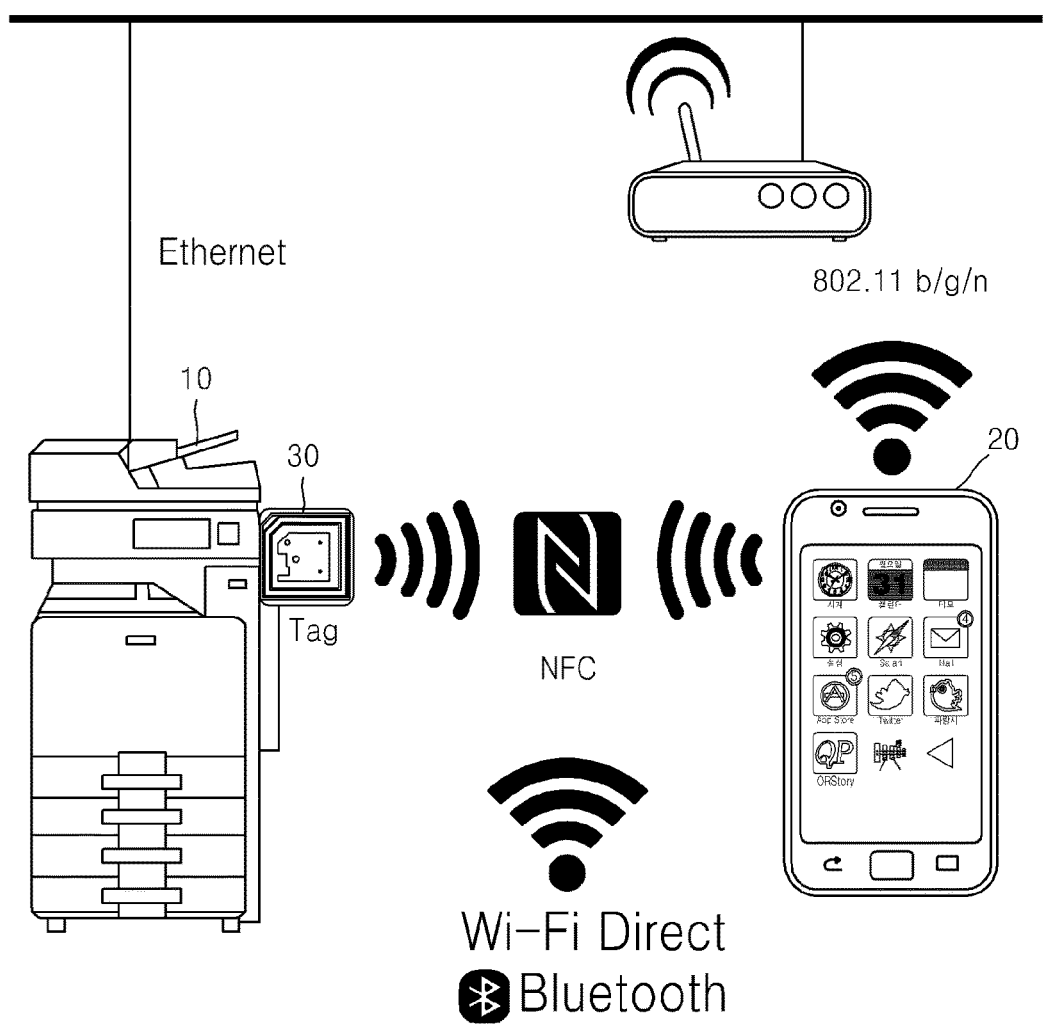
FIG. 1C illustrates a wireless communication environment including an image forming apparatus and a user device according to an exemplary embodiment of the present disclosure.

FIG. 1C illustrates an alternative wireless communication environment according to another exemplary embodiment of the present disclosure, in which an image forming apparatus 10 and a mobile device 20 are present. Referring to FIG. 1C, other peripheral wired/wireless networks are illustrated in addition to the NFC environment 1 of FIG. 1A or 1B. The NFC environment 1 may operate in combination with peripheral wired/wireless networks, such as Wi-Fi Direct, Bluetooth, Ethernet, 802.11a/b/g/n, etc.

Before describing the exemplary embodiments of the present disclosure in detail, NFC technology will be described.

NFC is a contactless short-range wireless communication standard between electronic devices within a short distance of about 10 cm with low power consumption by using a frequency of about 13.56 MHz. A data transfer rate of NFC is about 424 Kbps, and NFC has excellent security due to high proximity and encryption technology. NFC forgoes a complicated pairing process of recognition of devices but allows devices to detect one another within about 1/10 second or less. In particular, NFC is a smart card type contactless wireless communication technology where radio frequency identification (RFID) technology is utilized. In addition, NFC builds upon RFID technology by allowing two-way communication whereas conventional smart cards only allow one-way communication. Furthermore, NFC has a relatively large memory storage space and offers more variety of services.

In detail, NFC is a wireless communication method in which data is directly exchanged between terminals, for example, between the image forming apparatus 10 and the mobile device 20, without using a communication network, and is a type of RFID method. A wireless communication method using RFID may be classified according to frequencies used. For example, RFID at about 13.56 MHz is mainly used for smart cards, such as transit cards or entrance cards, and RFID at about 900 MHz is used mainly for logistics. NFC corresponds to RFID which, like smartcards, uses a frequency of about 13.56 MHz. However, unlike smartcards, which allow only one-way communication, NFC allows two-way communication. Accordingly, NFC is different from smart cards, which function merely as a tag that stores particular information and transmit the same to a reader. NFC allows a tag function according to necessity but also supports a function of recording information on the tag, and may be used in peer to peer (P2P) data exchange between terminals in which NFC is set.

Figure 2A:
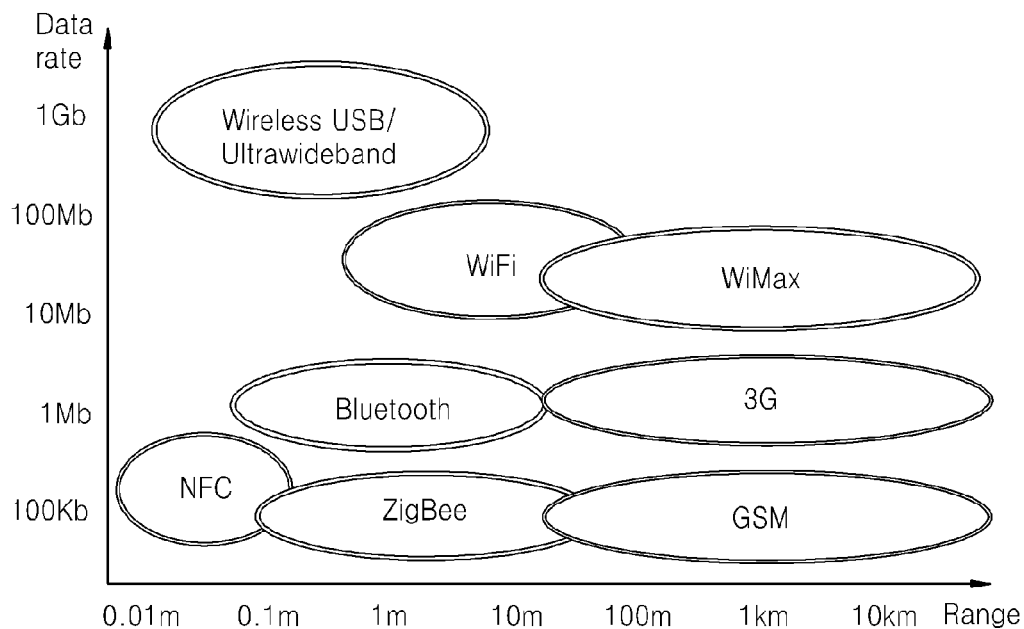
FIG. 2A is a graph comparing data rates and communication ranges of NFC and other wireless communication methods.

NFC which is developed based on RFID may be compared with other wireless communication methods, such as Wi-Fi, Bluetooth, ZigBee, etc., as illustrated in FIG. 2A.

FIG. 2A is a graph comparing data rates and communication ranges of NFC and other wireless communication methods. Referring to FIG. 2A, compared to other wireless communication methods, NFC may operate at a distance within about 10 cm. Unlike Bluetooth or Wi-Fi etc., which allow communication in about several to several tens of meters, NFC allows communication only within a short distance (about 10 cm) comparing to other wireless communication methods.

In addition, NFC may be compared to other wireless communication methods, such as Bluetooth, ZigBee, etc., as described in Table 1 below.

TABLE 1

| Technology | Frequency used | Security | Standard range | Major service area |
|---|---|---|---|---|
| NFC | About 13.56 MHz | Encryption is applied | International Standard | contactless payment, RFID, file transmission |
| Bluetooth | About 2.4 GHz | N/A | International Standard | file transmission |
| ZigBee | About 2.4 GHz | N/A | International Standard | device control, RFID |
| 900 MHz RFID | About 900 MHz | N/A | Korean standard | RFID |

In other words, compared to other wireless communication methods, NFC operates only within a distance of about 10 cm and encryption technology is applied thereto, and thus, a security level of NFC is high. Accordingly, when used in combination with other high-speed wireless communication methods, such as 3G or Wi-Fi, communication between devices via NFC may be performed with a higher efficiency. Here, the authentication may be performed via NFC while data transmission may be performed via other types of high-speed wireless communication methods. For example, when NFC and Bluetooth technology are combined, NFC may be used in connecting terminals (authorization) and Bluetooth may be used in data transmission between the terminals to thereby enable more efficient communication between the devices.

Figure 2B:
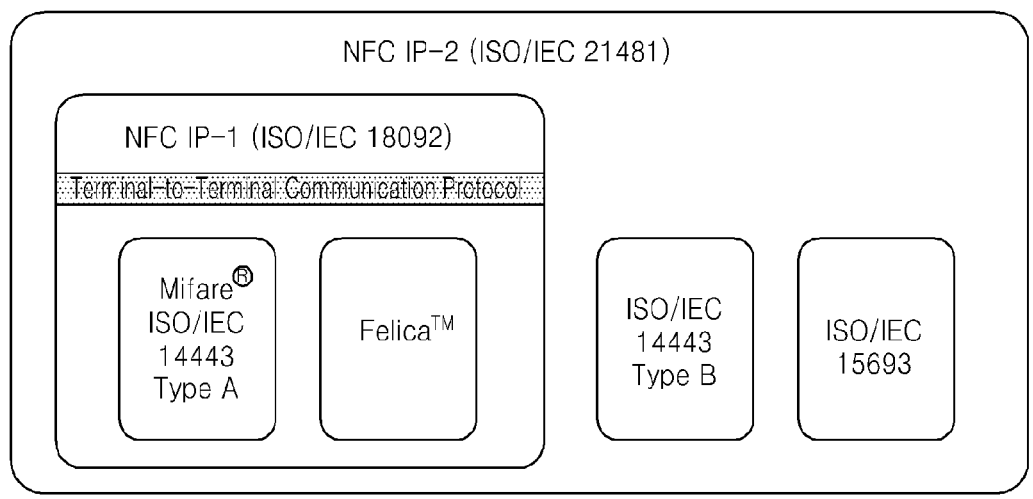
FIG. 2B is a view of standards related to NFC technology.

FIG. 2B is a view of standards related to NFC technology.

Referring to FIG. 2B, NFC standard technology follows International Organization for Standardization (ISO) and is also an extension of ISO 14443 Proximity-card Standard, and here, the inclusion relation of NFC IP-1(NFC Interface Protocol-1) (ISO/IEC 18092) and NFC IP-2(ISO/IEC 21481) is illustrated. Here, ISO/IEC 14443 Type A and Type B, FeliCa, and ISO/IEC 15693 are international standards of four areas of contactless cards operating at about 13.56 MHz. Also, ISO/IEC 18092 defines communication modes for NFC interface and protocol.

Figure 3A:
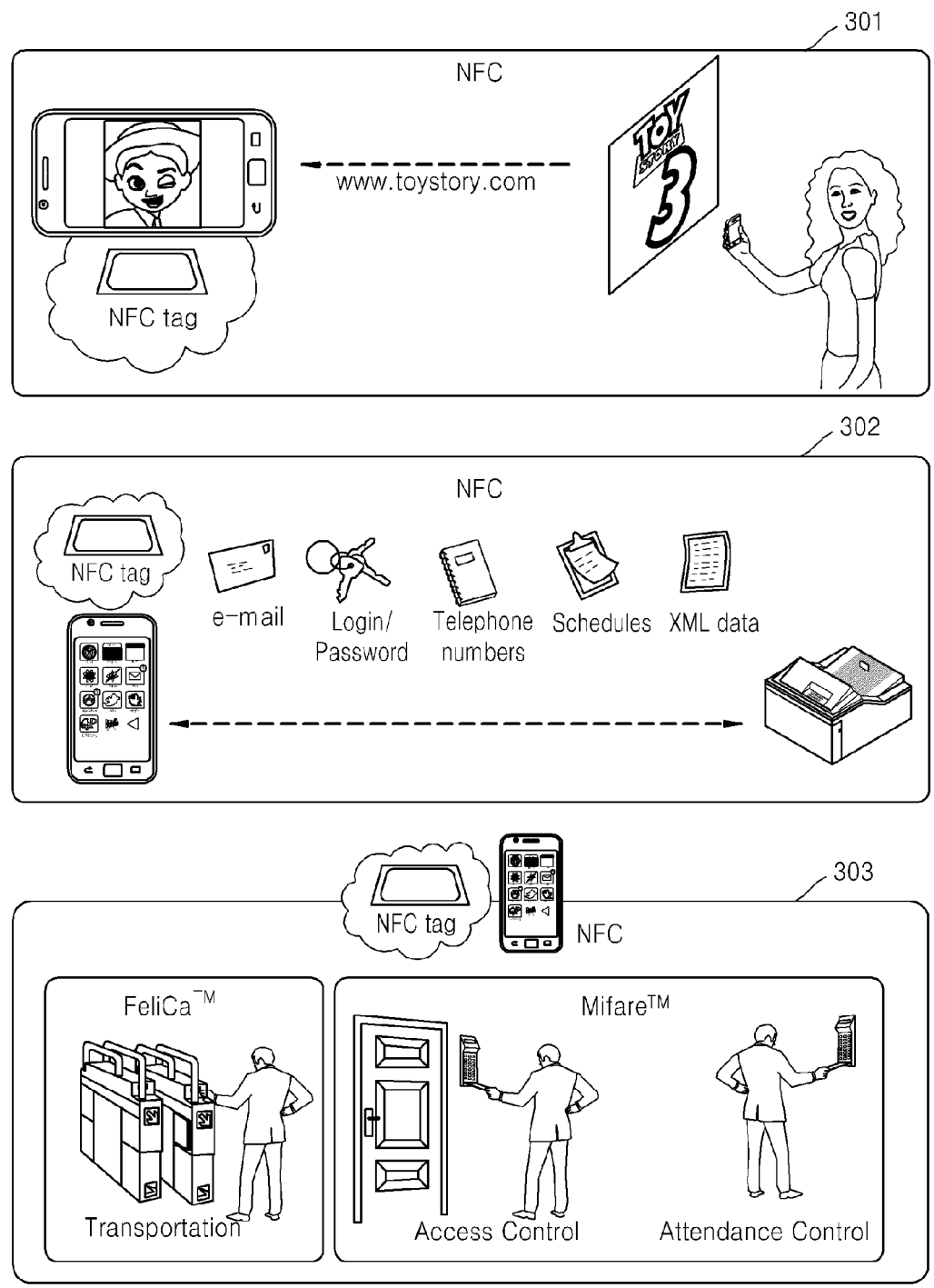
FIGS. 3A and 3B are diagrams to explain three communication modes of NFC.
Figure 3B:
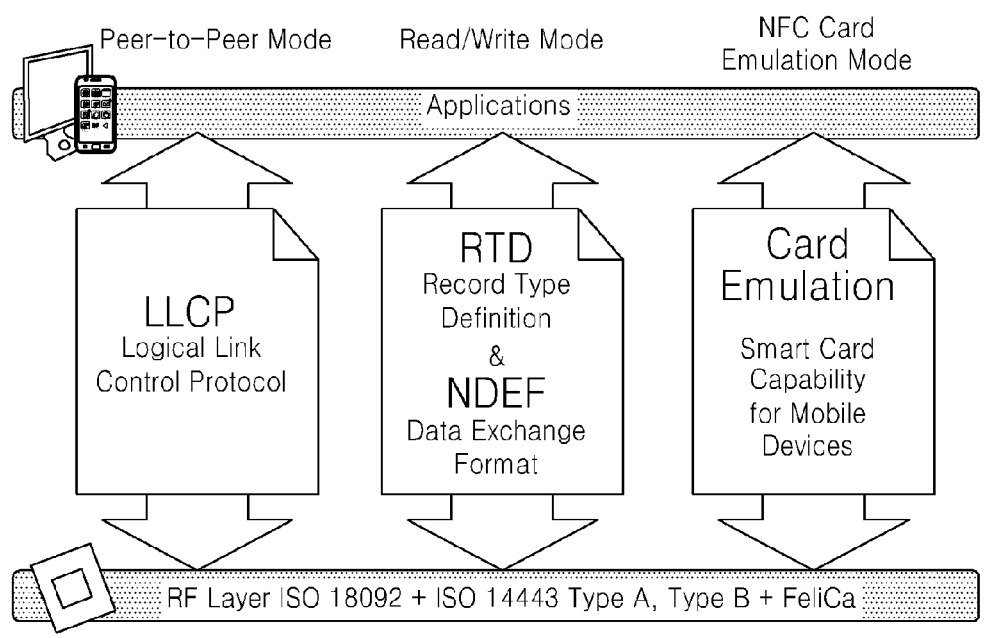

FIGS. 3A and 3B are diagrams to explain three communication modes of NFC.

Referring to FIG. 3A, the NFC Forum has standardized major NFC communication modes, which are a Reader/Writer mode 301, a P2P mode 302, and a Card Emulation mode 303. In sum, the three communication modes of NFC may be listed as in Table 2 below.

TABLE 2

|  | ISO/IEC 15693 | ISO/IEC 18092 | ISO/IEC 14443 |
| --- | --- | --- | --- |
| Operational mode | communication between reader and tag (VCD, Reader/Writer mode) | communication between devices (P2P mode) | communication between reader and tag (PCD, Card Emulation mode) |
| Power supply | Manual | active and manual | manual |
| Range of communication | About 1 m | About 10-20 cm | About 10 cm |
| Data rate | About 26 Kbps or less | About 106 Kbps, 212 Kbps, 424 Kbps | About 106 Kbps |

(PCD: Proximity Coupling Device, VCD: Vicinity Coupling Device)

First, the Reader/Writer mode 301 supports that the mobile device 20, in which an NFC tag 30 is embedded, operates as a reader to read another NFC tag 30 or operates as a writer to input information to another NFC tag 30.

In the P2P mode 302, communication at a link level between two NFC terminals, for example, between the image forming apparatus 10 and the mobile device 20, is supported (ISO/IEC 18092). To establish a connection, a client (NFC P2P initiator, the mobile device 20) searches for a host (NFC P2P target, the image forming apparatus 10) and transmits data of an NFC Data Exchange Format (NDEF). In the P2P mode 302, data, such as emails, login/password information, schedules, telephone numbers, and XML data, may be exchanged between the image forming apparatus 10 and the mobile device 20 via the established connection, and also data may be exchanged just by touching the image forming apparatus 10 with the mobile device 20.

Finally, in the Card Emulation mode 303, the mobile device 20, in which an NFC tag 30 is embedded, operates as a smart card (ISO/IEC 14443). Accordingly, NFC is compatible not only with ISO 14443, which is the international standard for contactless cards, but also with FeliCa by Sony and MiFare by Philips.

In order to coordinately provide the three communication modes of NFC, a protocol is standardized as illustrated in FIG. 3B. Referring to FIG. 3B, a software structure in an NFC system is illustrated.

Logical Link Control Protocol (LLCP) is a protocol that sets a communication connection between layers and controls the same. An NFC Data Exchange Format (NDEF) message is a basic message structure defined in an NFC communication protocol. The NDEF is a standard exchange format for Uniform Resource Identifier (URI), smart posters, and others, which defines a recording format regarding message exchange between NFC Forum-compatible devices and tags. An NDEF message includes at least one NDEF record. The NDEF record includes a payload that is described according to type, length, and option identifiers. An NDEF payload may refer to application data included in an NDEF record. Record Type Definition (RTD) defines a record type and a type name which may correspond to an NDEF record.

Figure 4:
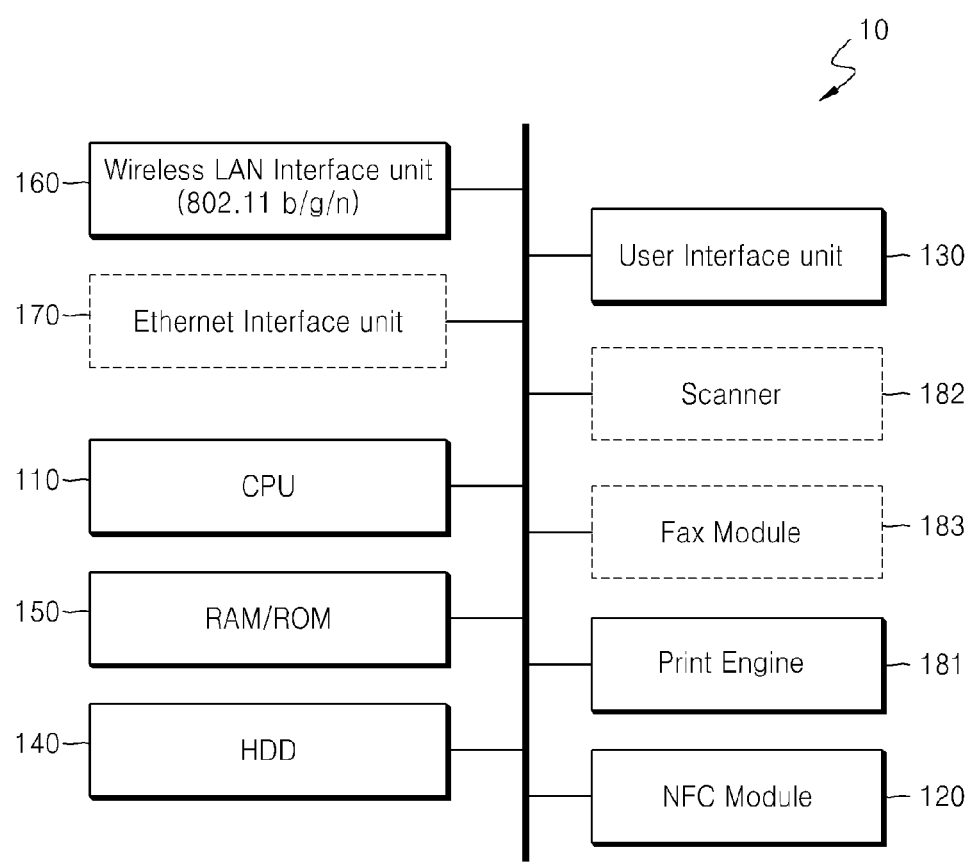
FIG. 4 is a block diagram illustrating a basic hardware structure of an image forming apparatus supporting an NFC function, according to an exemplary embodiment of the present disclosure.

FIG. 4 is a block diagram illustrating a basic hardware structure of the image forming apparatus 10 supporting an NFC function, according to an exemplary embodiment of the present disclosure. Referring to FIG. 4, the image forming apparatus 10 may include a central processing unit (CPU) 110, an NFC module 120, a user interface unit 130, a hard disk drive (HDD) 140, a random access memory/read only memory (RAM/ROM) 150, a wireless local area network (WLAN) interface unit 160, an Ethernet interface unit 170, a print engine 181, a scanner 182, and a fax module 183. If the image forming apparatus 10 supports only WLAN, the Ethernet interface unit 170 may not be included. Also, if the image forming apparatus 10 is a printer, the scanner 182 and the fax module 183 may not be included.

The CPU 110 controls the overall operation of the image forming apparatus 10, and information needed to control and print data is stored in the HDD 140 and the RAM/ROM 150 and read therefrom when necessary.

The user interface unit 130 is hardware used as a medium for the user when the user checks information of the image forming apparatus 10 and inputs a command to the image forming apparatus 10. The user interface unit 130 may be designed in various manners according to products. For example, it may be formed in a simple form of two or four lines on a display, such as a liquid crystal display (LCD) or light emitting diode (LED), or as a graphical user interface (GUI), so as to enable various graphical representations.

The WLAN interface unit 160 may refer to hardware that performs IEEE 802.11 a/b/g/n functionality, and may communicate with a main board of the image forming apparatus 10 via a universal serial bus (USB) or the like. The WLAN interface unit 160 may also support Wi-Fi Direct at the same time.

The Ethernet interface unit 170 may refer to hardware that performs wired Ethernet communication according to IEEE 802.3.

The print engine 181, the scanner 182, and the fax module 183 may refer to hardware to perform a printing function, a scan function, and a fax function, respectively.

In particular, the image forming apparatus 10 includes the NFC module 120 to thereby communicate with other NFC devices, such as the mobile device 20, via NFC. The NFC module 120 is in charge of the NFC function and may read data from or write data to an NFC tag 30. Also, communication with the main board of the image forming apparatus 10 is performed by using a Universal Asynchronous Receiver/Transmitter (UART), an Inter Integrated Circuit (I2C), a Serial Peripheral Interface Bus (SPI), or the like (not illustrated). As described above with reference to FIGS. 1A and 1B, the NFC module 120 may be embedded in the image forming apparatus 10 in advance at the time of factory shipment, or may be available when the user installs the NFC tag 30 later.

Although not illustrated in FIG. 4, the image forming apparatus 10 may also include other wireless communication modules, such as a Bluetooth module or a ZigBee module.

Figure 5:
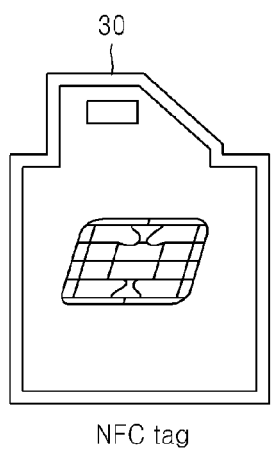
FIG. 5 illustrates an NFC tag and information stored in the NFC tag installed in the image forming apparatus of FIG. 1B.

FIG. 5 illustrates the NFC tag 30 installed in the image forming apparatus 10 of FIG. 1B and information 510 stored in the NFC tag 30. Referring to FIG. 5, in the case of the image forming apparatus 10 of FIG. 1B, the NFC function may be utilized when the NFC tag 30 is inserted into a slot (not illustrated) that is provided in advance in the image forming apparatus 10. The information 510 of the NFC tag 30, for example, performance information of the image forming apparatus 10, may be recorded by other NFC devices in the Reader/Writer mode 301 or may be stored in advance by a manager.

Hereinafter, detailed functions and operations of a mobile device 20 and an image forming apparatus 60 that provide an extended UI screen according to an embodiment of the present disclosure will be described in detail with reference to the drawings below.

Figure 6:
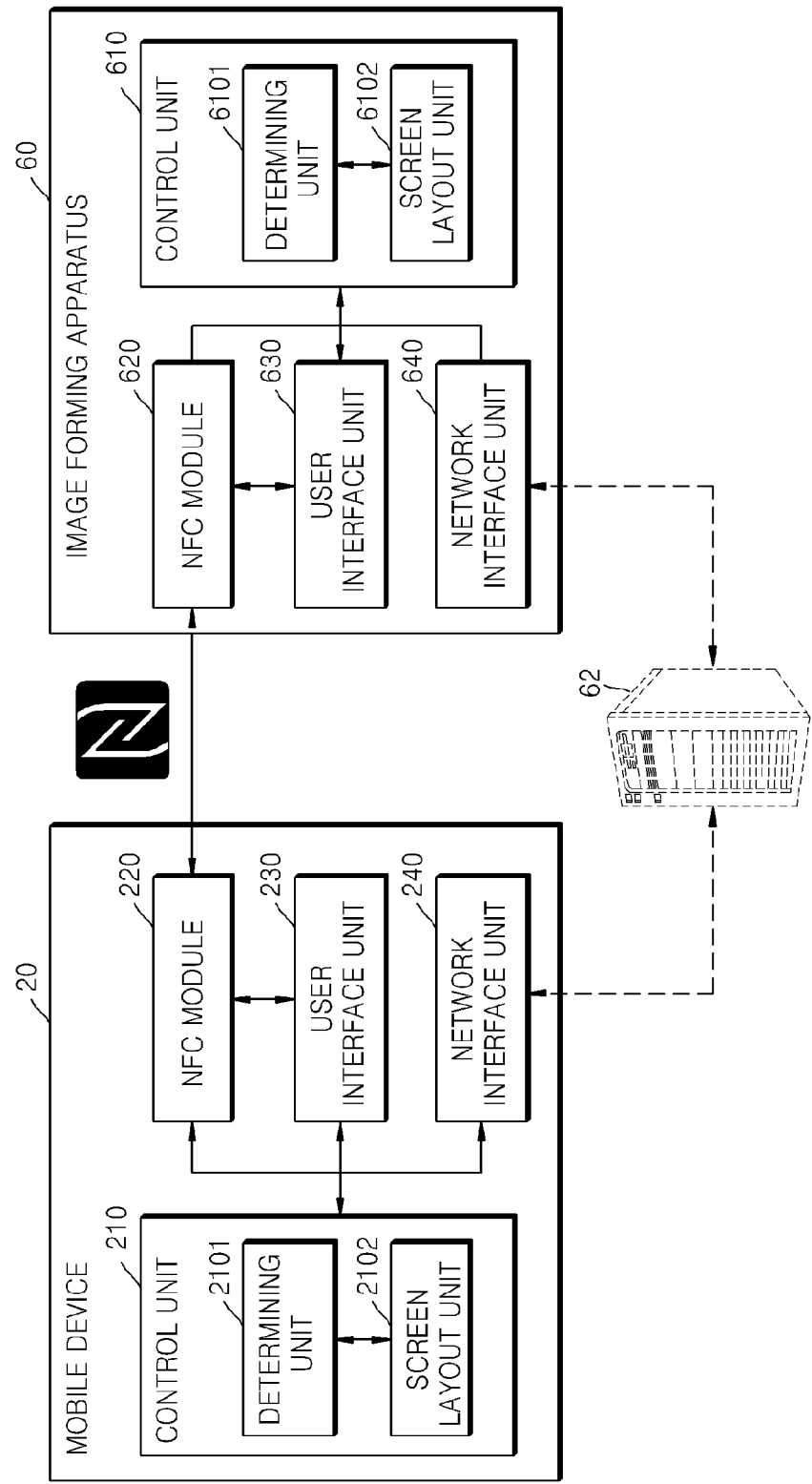
FIG. 6 is a block diagram illustrating a hardware structure of an image forming apparatus that provides an extended user interface (UI) and a hardware structure of a mobile device, according to an embodiment of the present disclosure.

FIG. 6 is a block diagram illustrating a hardware structure of an image forming apparatus 60 that provides an extended user interface (UI) and a hardware structure of the mobile device 20, according to an embodiment of the present disclosure.

In FIG. 6, only hardware components related to the current exemplary embodiment of the present disclosure will be described in order not to obscure the characteristics of the current exemplary embodiment. However, it will be understood by one of ordinary skill in the art that general-use hardware components other than the illustrated hardware components in FIG. 6 may also be included.

Referring to FIG. 6, the image forming apparatus 60 is illustrated as including just hardware components related to the current exemplary embodiment from among the hardware components of the image forming apparatus 10 illustrated in FIG. 4. However, it will be understood by one of ordinary skill in the art that elements that are omitted in FIG. 6 but described with reference to the image forming apparatus 10 of FIG. 4 may also be applied to the image forming apparatus 60.

The image forming apparatus 60 includes a control unit 610, an NFC module 620, a user interface unit 630, and a network interface unit 640. The control unit 610 includes a determining unit 6101 and a screen layout unit 6102. In FIG. 6, the control unit 610 corresponds to the CPU 110 of FIG. 4, and the NFC module 620 corresponds to the NFC module 120 of FIG. 4, and the user interface unit 630 corresponds to the user interface unit 130 of FIG. 4. The network interface unit 640 corresponds to hardware that includes the WLAN interface unit 160 or the Ethernet interface unit 170 of FIG. 4.

The mobile device 20 includes a control unit 210, an NFC module 220, a user interface unit 230, and a network interface unit 640. The control unit 210 includes a determining unit 2101 and a screen layout unit 2102.

Meanwhile, the network interface unit 640 of the image forming apparatus 60 and the network interface unit 240 of the mobile device 20 may be hardware that may be selectively included in the image forming apparatus 60 and the mobile device 20.

First, an operation of providing an extended UI screen via NFC with the image forming apparatus 60 on a side of the mobile device 20 will be described.

The NFC module 220 of the mobile device 20 detects access of the image forming apparatus 60 according to an NFC protocol. In order to activate the NFC function and establish a connection, as described above, the image forming apparatus 60 corresponding to a client and the mobile device 20 corresponding to a host have to access each other within a proximity range of the NFC modules, for example, about 10 cm. However, the present disclosures not limited thereto. The mobile device may correspond to a host and the image forming apparatus may correspond to a client.

Accordingly, the NFC module 220 of the mobile device 20 transmits or receives an NDEF message defined according to the NFC standards, to or from the NFC module 620, to complete authentication of the image forming apparatus 60, and tagging between the mobile device 20 and the image forming apparatus 60 is also completed via NFC.

Meanwhile, an operation of establishing a connection by devices having an NFC function (e.g., the mobile device 20 and the image forming apparatus 60) via NFC is apparent to one of ordinary skill in the art, and thus, detailed description thereof is omitted.

When the image forming apparatus 60 is tagged via NFC, the NFC module 220 of the mobile device 20 receives information about product specifications of the image forming apparatus 60. For example, the product specifications may be a size of a display, CPU performance, memory capacity, capacity of a hard drive (e.g., a hard disk drive or a solid state drive), or the like, included in the image forming apparatus 60.

Figure 7:
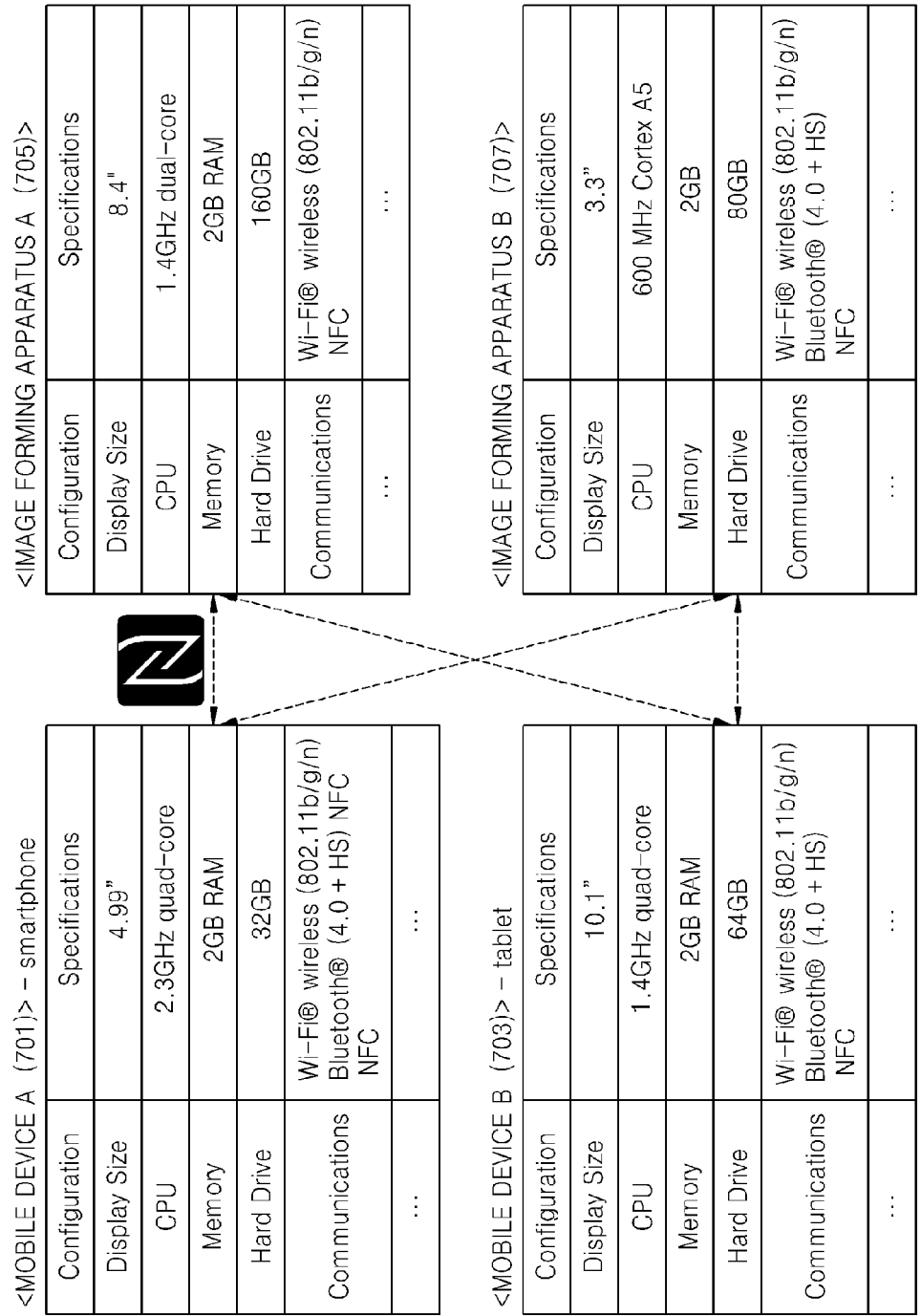
FIG. 7 illustrates product specifications of devices according to embodiments of the present disclosure.

FIG. 7 illustrates product specifications of devices according to embodiments of the present disclosure.

Referring to FIG. 7, a mobile device A 701, a mobile device B 702, an image forming apparatus A 705, and an image forming apparatus B 707 all support an NFC function and may be tagged by one another via NFC. Also, the mobile device A 701, the mobile device B 702, the image forming apparatus A 705, and the image forming apparatus B 707 may all have a user interface screen.

As a non-limiting example, the mobile device A 701 may be a device corresponding to a smartphone and has a display size of 4.99 inches and a CPU of a 2.3 GHz quad-core processor.

As a non-limiting example, the mobile device B 703 may be a device corresponding to a tablet device and has a display size of 10.1 inches and a CPU of a 1.4 GHz quad-core processor.

As a non-limiting example, the image forming apparatus A 705 may be a device corresponding to a multi-function product (MFP) providing image forming functions such as copying, printing, faxing, or scanning, and has a display size of 8.4 inches and a CPU of a 1.4 GHz dual-core processor.

As a non-limiting example, the image forming apparatus B 707 may be a device corresponding to a printer providing a printing function, and has a display size of 3.3 inches and a CPU of a 600 MHz Cortex A5 processor.

The mobile device A 701, the mobile device B702, the image forming apparatus A 705, and the image forming apparatus B 707 may also have other various product specifications than those illustrated in FIG. 7.

Referring to FIG. 6 again, the NFC module 220 of the mobile device 20 receives information about product specifications of the image forming apparatus 60 as those of the image forming apparatus A 705 or the image forming apparatus B 707.

The control unit 210 of the mobile device 20 determines a screen component of a second user interface screen of the mobile device 20 which operates while being linked to a first user interface screen of the image forming apparatus 60 with respect to a predetermined application, based on the product specifications of the image forming apparatus 60.

In detail, the determining unit 2101 of the control unit 210 compares product specifications of the mobile device 20 (for example, the product specifications of the mobile device A 701 or of the mobile device B 703 of FIG. 7) and the product specifications of the image forming apparatus 60 (for example, the product specifications of the image forming apparatus A 705 or of the image forming apparatus B 707 of FIG. 7). Then, the determining unit 2101 determines which of the mobile device 20 and the image forming apparatus 60 has either superior or inferior product specifications.

For example, the determining unit 2101 may compare, among the product specifications, display sizes of the mobile device 20 and the image forming apparatus 60, and may determine a device having a larger display size as a device having superior product specifications. Alternatively, the determining unit 2101 may compare, among the product specifications, display sizes of the mobile device 20 and the image forming apparatus 60, and may determine a device having a smaller display size as a device having inferior product specifications. That is, the determining unit 2101 may determine either a superior or an inferior device among the mobile device 20 and the image forming apparatus 60 based on the display size.

However, according to the current embodiment of the present disclosure, the determining unit 2101 may consider various factors, for example, not only a display size, but also CPU performance, memory capacity, a resolution of the display or hard drive capacity, etc. to determine a superior or inferior device among the mobile device 20 and the image forming apparatus 60. For example, the determining unit 2101 may compare devices by applying weights to each item of the product specifications, may compare at least one item, or may compare only one item. That is, the current embodiment of the present disclosure is not limited to any one function of the determining unit 2101. However, hereinafter, for convenience of description, the determining unit 2101 that determines a superior or inferior device based on a display size will be described.

Meanwhile, the determining unit 2101 may further determine, not only the above product specifications, types of applications to be executed in the mobile device 20 and the image forming apparatus 60 or types of contents to be processed in the applications. This will be described with reference to FIGS. 9 through 13 which are to be further described.

The screen layout unit 2102 of the control unit 210 determines a screen layout of a second user interface screen of the mobile device 20 based on a determination result of the determining unit 2101. Also, the screen layout unit 2102 may also determine a screen layout of a first user interface screen of the image forming apparatus 60 based on the determination result.

That is, the screen layout unit 2102 determines whether a second user interface screen of the mobile device 20 is to be a screen layout corresponding to a main screen or a screen layout corresponding to a sub-screen, with respect to an image job application, a text editing application, or a contents providing application, for example. Meanwhile, it would be apparent to one of ordinary skill in the art that the terminology such as a main screen or a sub-screen are exemplary, and may also be replaced with other terminology.

Furthermore, the screen layout unit 2102 may also determine, with respect to the above applications, whether a first user interface screen of the image forming apparatus 60 is to be a screen layout corresponding to a main screen or a screen layout corresponding to a sub-screen.

In detail, the control unit 210, particularly, the screen layout unit 2102, may determine one of the first user interface screen of the image forming apparatus 60 and the second user interface screen of the mobile device 20 as a main screen and the other as a sub-screen. The first user interface screen of the image forming apparatus 60 and the second user interface screen of the mobile device 20 may have different screen layouts.

The main screen and the sub-screen are screens corresponding to portions of an extended UI screen, and may be allocated to each of the image forming apparatus 60 and the mobile device 20. That is, if the first user interface screen of the image forming apparatus 60 is allocated as a main screen by the control unit 210, the second user interface screen of the mobile device 20 may be allocated as a sub-screen. On the other hand, when the first user interface screen of the image forming apparatus 60 is allocated as a sub-screen, the second user interface screen of the mobile device 20 may be allocated as a main screen.

Figure 8:
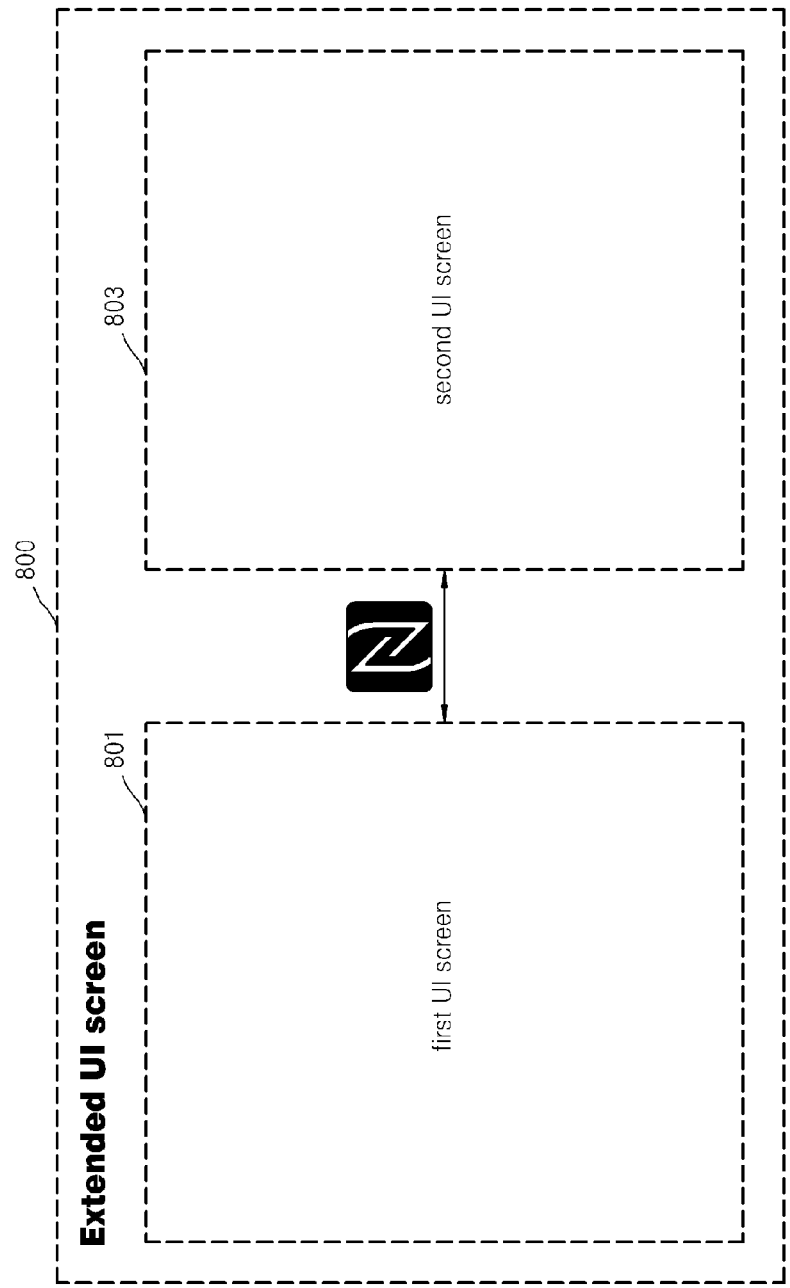
FIG. 8 illustrates an extended UI screen according to an embodiment of the present disclosure.

FIG. 8 illustrates an extended UI screen 800 according to an embodiment of the present disclosure.

Referring to FIG. 8, the extended UI screen 800 may include a first user interface screen 801 of the image forming apparatus 60 and a second user interface screen 803 of the mobile device 20. The first user interface screen 801 and the second user interface screen 803 correspond to user interface screens that operate dependently upon each other via NFC. That is, the first user interface screen 801 of the image forming apparatus 60 and the second user interface screen 803 of the mobile device 20 of the extended UI screen 800 operate by being linked to each other. This is because the image forming apparatus 60 and the mobile device 20 are tagged by each other via NFC.

The extended UI screen 800 according to the current embodiment of the present disclosure may refer to a virtual user interface space where the first and second user interface screens 801 and 803 of the user interface units 630 and 230 included in separate devices (the image forming apparatus 60 and the mobile device 20) may be used as a single user interface screen.

Screen layouts of the first user interface screen 801 and the second user interface screen 803 may differ according to a determination result of the determining unit 2101. In detail, this will be described in connection with FIG. 7.

For example, when it is assumed that the mobile device A 701 of FIG. 7 is tagged to the image forming apparatus A 705 via NFC, the determining unit 2101 compares display sizes of the mobile device A 701 and the image forming apparatus A 705 to determine a device having a larger display size. While it is assumed in FIG. 7 that the display size of the mobile device A 701 is 4.99 inches, and the display size of the image forming apparatus A 705 is 8.4 inches, the determining unit 2101 determines that the image forming apparatus A 705 has a larger display size.

The screen layout unit 2102 determines the first user interface screen 801 of the image forming apparatus A 705 as a screen layout corresponding to a main screen as a result of determination. Then, the screen layout unit 2102 determines the second user interface screen 803 of the mobile device A 701 as a screen layout corresponding to a sub-screen.

When the first user interface screen 801 of the image forming apparatus A 705 corresponds to a main screen, since the display size of the image forming apparatus A 705 is relatively large, more screen layouts in which more menu items or more contents are provided may be displayed in the first user interface screen 801 than in the second user interface screen 803. A user may experience more convenience when using a relatively large display screen than when using a relatively small display screen.

On the other hand, when the second user interface screen 803 of the mobile device A 701 corresponds to a sub-screen, since the display size of the mobile device A 701 is relatively small, simple screen layouts in which simpler menu items or shortcuts may be provided compared to the first user interface screen 801 may be provided in the second user interface screen 803.

According to another example, when it is assumed that the mobile device B 703 is tagged with the image forming apparatus B 707 via NFC, since a display size of the mobile device B 703 is 10.1 inches, and a display size of the image forming apparatus B 707 is 3.3 inches, the determining unit 2101 determines that the display size of the mobile device B 707 is larger. Then, the screen layout unit 2102 determines the first user interface screen 801 of the image forming apparatus B 707 as a screen layout corresponding to a sub-screen, and the second user interface screen 803 of the mobile device B 703 as a screen layout corresponding to a main screen.

That is, a main screen or a sub-screen may be determined in various manners according to product specifications of devices that are tagged by each other (for example, display sizes). In other words, screen layouts of the first user interface screen 801 and the second user interface screen 803, which may correspond to a main screen or a sub-screen on the extended UI screen 800, may be dynamic.

Referring back to FIG. 6, the user interface unit 230 displays a second user interface screen having a screen layout determined by the control unit 210 before, with respect to predetermined applications such as an image job application, a text editing application, or a contents providing application, which is executable on the mobile device 20.

The displayed second user interface screen may have a screen layout corresponding to a main screen or a screen layout corresponding to a sub-screen, as described above.

Job information of a user that is input via the second user interface screen displayed on the user interface unit 230 is transmitted to the image forming apparatus 60 via the NFC module 220. Then, the first user interface screen displayed on the user interface unit 630 of the image forming apparatus 60 is controlled or operated based on the job information of the user that is received via the NFC module 620.

On the other hand, the second user interface screen of the mobile device 20 may be controlled and displayed based on the job information of the user input via the first user interface screen of the image forming apparatus 60. That is, the first user interface screen of the image forming apparatus 60 and the second user interface screen of the mobile device 20 in the extended UI screen 800 operate while being linked to each other.

For example, via the NFC module 220 of the mobile device 20, if an activation command of any upper menu, input via the first user interface screen of the image forming apparatus 60, is received, lower menus of this upper menu or the sub-menus that are included in the upper menu may be activated and displayed on the second user interface screen of the mobile device 20.

The operation of providing an extended UI screen on the side of the mobile device 20 has been described above. Hereinafter, an operation of providing an extended UI screen on the side of the image forming apparatus 60 will be described.

The NFC module 620 of the image forming apparatus 60 detects access of the mobile device 20 according to an NFC protocol. Accordingly, the NFC module 620 of the image forming apparatus 60 transmits or receives an NDEF message defined according to the NFC standards, to or from the NFC module 220, to complete authentication of the mobile device 20, and tagging between the mobile device 20 and the image forming apparatus 60 is also completed via NFC.

When the mobile device 20 is tagged via NFC, the NFC module 620 of the image forming apparatus 60 receives information about product specifications, for example, of the mobile device 20. The product specifications may be a size of a display, CPU performance, memory capacity, capacity of a hard drive (e.g., a hard disk drive or a solid state drive), or the like, included in the mobile device 20.

The NFC module 620 of the image forming apparatus 60 may receive information about product specifications such as the product specifications of the mobile device A 701 or the mobile device B 703 of FIG. 7.

The control unit 610 of the image forming apparatus 60 determines a screen layout of a first user interface screen of the image forming apparatus 60 that operates while being linked to a second user interface screen of the mobile device 20 with respect to a predetermined application based on the product specifications of the mobile device 20.

In detail, the determining unit 6101 of the control unit 610 compares product specifications of the mobile device 20 (for example, the product specifications of the mobile device A 701 or of the mobile device B 703 of FIG. 7) and the product specifications of the image forming apparatus 60 (for example, the product specifications of the image forming apparatus A 705 or of the image forming apparatus B 707 of FIG. 7). Then, the determining unit 6101 determines which of the mobile device 20 and the image forming apparatus 60 has either superior or inferior product specifications.

The determining unit 6101 may compare display sizes of the mobile device 20 and the image forming apparatus 60 to determine a device having a larger display size as a device having superior product specifications. Alternatively, the determining unit 6101 may compare display sizes of the mobile device 20 and the image forming apparatus 60 among product specifications, and determine a device having a smaller display size as a device having inferior product specifications. That is, the determining unit 6101 may determine a device having superior or inferior product specifications among the mobile device 20 and the image forming apparatus 60 based on the display size.

However, according to the current embodiment of the present disclosure, the determining unit 6101 may consider various factors, for example, not only a display size, but also CPU performance, memory capacity, or hard drive capacity, etc. to determine a superior or inferior device among the mobile device 20 and the image forming apparatus 60. For example, the determining unit 6101 may compare devices by applying weights to each item of the product specifications, may compare at least one item, or may compare only one item. That is, the current embodiment of the present disclosure is not limited to any one function of the determining unit 6101. However, hereinafter, for convenience of description, the determining unit 6101 that determines a superior or inferior device based on a display size will be described.

Meanwhile, the determining unit 6101 may further determine, for example, not only the above product specifications, types of applications to be executed in the mobile device 20 and the image forming apparatus 60 or types of contents to be processed in the applications. This will be described with reference to FIGS. 9 through 13 which are to be further described.

The screen layout unit 6102 of the control unit 610 determines a screen layout of a second user interface screen of the image forming apparatus 60 based on a determination result of the determining unit 6101. Also, the screen layout unit 6102 may also determine a screen layout of a first user interface screen of the mobile device 20 based on the determination result.

That is, the screen layout unit 6102 determines whether a first user interface screen of the image forming apparatus 60 is to be a screen layout corresponding to a main screen or a screen layout corresponding to a sub-screen, with respect to an image job application, a text editing application, or a contents providing application, for example.

Furthermore, the screen layout unit 6102 may also determine, with respect to the above applications, whether a second user interface screen of the mobile device 20 is to be a screen layout corresponding to a main screen or a screen layout corresponding to a sub-screen.

In detail, the control unit 610, particularly, the screen layout unit 6102, may determine one of the first user interface screen of the image forming apparatus 60 and the second user interface screen of the mobile device 20 as a main screen and the other as a sub-screen.

As described above with reference to FIGS. 7 and 8, the first user interface screen of the image forming apparatus 60 and the second user interface screen of the mobile device 20 may have different screen layouts.

That is, screen layouts of the first user interface screen 801 and the second user interface screen 803 may be different according to a determination result of the determining unit 6101. In detail, this will be described with reference to FIGS. 7 and 8.

For example, when it is assumed that the image forming apparatus A 705 of FIG. 7 is tagged to the mobile device A 701 via NFC, the determining unit 6101 compares display sizes of the mobile device A 701 and the image forming apparatus A 705 to determine a device having a larger display size. While it is assumed in FIG. 7 that the display size of the mobile device A 701 is 4.99 inches, and the display size of the image forming apparatus A 705 is 8.4 inches, the determining unit 6101 determines that the image forming apparatus A 705 has a larger display size.

The screen layout unit 6102 determines the first user interface screen 801 of the image forming apparatus A 705 as a screen layout corresponding to a main screen as a result of determination. Then, the screen layout unit 6102 determines the second user interface screen 803 of the mobile device A 701 as a screen layout corresponding to a sub-screen.

When the first user interface screen 801 of the image forming apparatus A 705 corresponds to a main screen, since the display size of the image forming apparatus A 705 is relatively large, more screen layouts in which more menu items or more contents are provided may be displayed in the first user interface screen 801 than in the second user interface screen 803. A user may experience more convenience when using a relatively large display screen than when using a relatively small display screen.

On the other hand, when the second user interface screen 803 of the mobile device A 701 corresponds to a sub-screen, since the display size of the mobile device A 701 is relatively small, simple screen layouts in which simpler menu items or shortcuts may be provided compared to the first user interface screen 801 may be provided in the second user interface screen 803.

According to another example, when it is assumed that the image forming apparatus B 707 of FIG. 7 is tagged with the mobile device B 703 via NFC, since a display size of the mobile device B 703 is 10.1 inches and a display size of the image forming apparatus B 707 is 3.3 inches, the determining unit 6101 determines that the display size of the mobile device B 707 is larger. Then, the screen layout unit 6102 determines the first user interface screen 801 of the image forming apparatus B 707 as a screen layout corresponding to a sub-screen, and the second user interface screen 803 of the mobile device B 703 as a screen layout corresponding to a main screen.

That is, a main screen or a sub-screen may be determined in various manners according to product specifications of devices that are tagged by each other (for example, display sizes).

Referring back to FIG. 6, the user interface unit 630 displays a first user interface screen having a screen layout determined by the control unit 610 before, with respect to predetermined applications such as an image job application, a text editing application, or a contents providing application, which is executable on the image forming apparatus 60.

The displayed first user interface screen may have a screen layout corresponding to a main screen or a screen layout corresponding to a sub-screen, as described above.

Job information of a user that is input via the first user interface screen displayed on the user interface unit 630 is transmitted to the mobile device 20 via the NFC module 620. Then, the second user interface screen displayed on the user interface unit 630 of the mobile device 20 is controlled or operated based on the job information of the user that is received via the NFC module 620.

On the other hand, the first user interface screen of the image forming apparatus 60 may be controlled and displayed based on the job information of the user input via the second user interface screen of the mobile device 20. That is, the first user interface screen of the image forming apparatus 60 and the second user interface screen of the mobile device 20 in the extended UI screen operate while being linked to each other.

For example, via the NFC module 620 of the image forming apparatus 60, if an activation command of any upper menu, input via the second user interface screen of the mobile device 20, is received, lower menus of this upper menu or the sub-menus included in the upper menu may be activated and displayed on the first user interface screen of the image forming apparatus 60.

The operation of providing an extended UI screen on the side of the mobile device 20 or the image forming apparatus 60 has been described above. According to the current embodiment of the present disclosure, when NFC devices having an NFC function are tagged via NFC, a user interface screen of any NFC device may also be extended to another NFC device and used, and thus, even an NFC device having a narrow or small user interface screen may easily perform a job via a relatively wide user interface screen included in the other NFC device.

Figure 9:
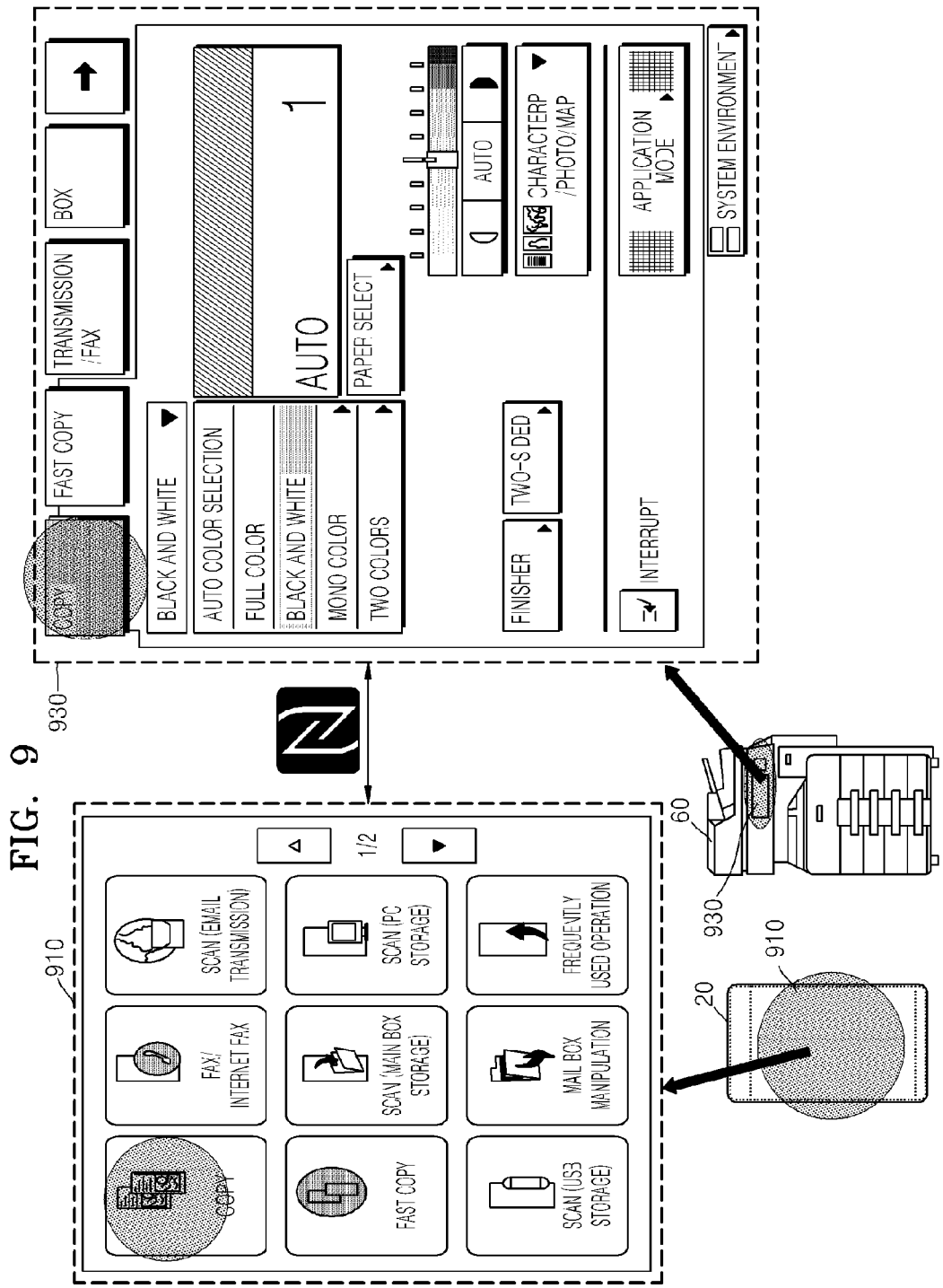
FIG. 9 illustrates a mobile device and an image forming apparatus that provide an extended UI screen regarding an image job application, according to an embodiment of the present disclosure.

FIG. 9 illustrates a mobile device 20 and an image forming apparatus 60 that provide an extended UI screen regarding an image job application, according to an embodiment of the present disclosure.

Referring to FIG. 9, it may be assumed that the mobile device 20 corresponds to the mobile device A 701 of FIG. 7, and the image forming apparatus 60 corresponds to the image forming apparatus A 705 of FIG. 7.

As illustrated in FIG. 7, as the display size of the mobile device A 701 (4.99 inches) is smaller than the display size of the image forming apparatus A 705 (8.4 inches), a user interface screen 910 of the mobile device A 701 (the mobile device 20) may correspond to a sub-screen, and a user interface screen 930 of the image forming apparatus A 705 (the image forming apparatus 60) may correspond to a main screen.

Either a main screen or a sub-screen may be determined by the control unit 210 included in the mobile device 20 or the control unit 610 included in the image forming apparatus 60.

Referring to FIG. 9, the user interface screen 910 of the mobile device A 701 (the mobile device 20) corresponds to a sub-screen, and thus, it has a screen layout in which relatively simple menus are included. For example, a copy menu, a fax menu, or a scan menu corresponding to upper menus provided on an image job application may be displayed as short cuts in the user interface screen 910.

On the other hand, the user interface screen 930 of the image forming apparatus A 705 (the image forming apparatus 60) corresponds to a main screen and thus has a screen layout having relatively detailed menus. For example, lower menus provided on an image job application may be displayed on the user interface screen 930. For example, if a short cut indicating a copy menu is selected via the user interface screen 910, lower menus or the sub-menus included in the upper menu, or specific option setups of the copy menu (setup for colors, the number of copies, or the like) may be displayed on the user interface screen 930.

That is, compared to the user interface screen 930, the user interface screen 910 is narrow or small, and accordingly, even when lower menus or specific option setups are displayed on the user interface screen 910, it may not be easy for a user to easily manipulate the user interface screen 910. Accordingly, according to the current embodiment of the present disclosure, for user convenience, a device (the image forming apparatus 60 or the image forming apparatus A 705) that provides a relatively large display screen may provide a relatively detailed or specific screen layout corresponding to a main screen.

If the user interface screen 910 and the user interface screen 930 have similar display sizes, other product specifications described above may be considered to determine a main screen or a sub-screen.

Figure 10:
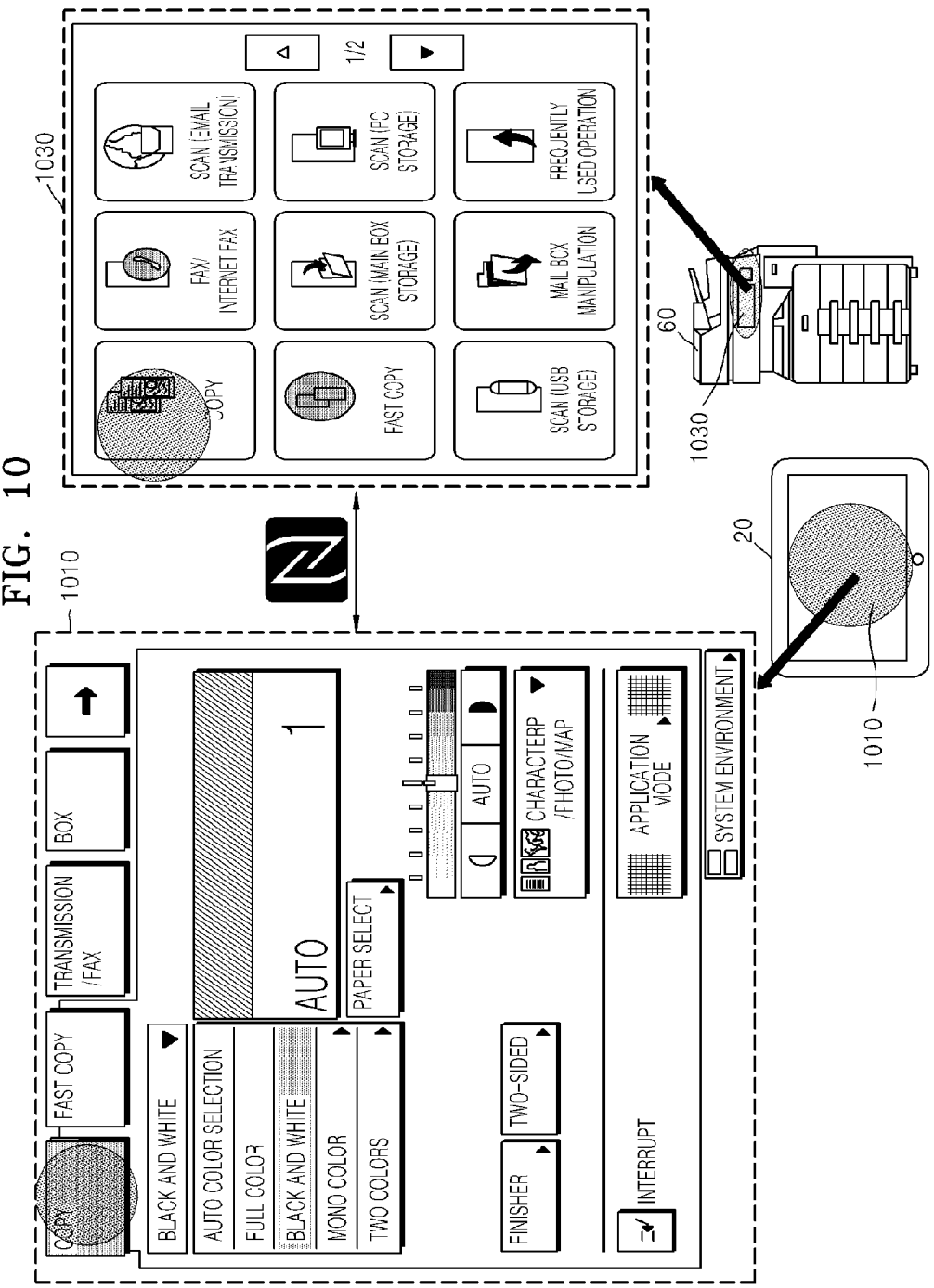
FIG. 10 illustrates a mobile device and an image forming apparatus that provide an extended UI screen regarding an image job application, according to another embodiment of the present disclosure.

FIG. 10 illustrates a mobile device 20 and an image forming apparatus 60 that provide an extended UI screen regarding an image job application, according to another embodiment of the present disclosure.

Referring to FIG. 10, it may be assumed that the mobile device 20 corresponds to the mobile device B 703 of FIG. 7 and the image forming apparatus 60 corresponds to the image forming apparatus A 705 of FIG. 7.

As illustrated in FIG. 7, as the display size of the mobile device B 703 (10.1 inches) is larger than the display size of the image forming apparatus A 705, a user interface screen 1010 of the mobile device B 703 (the mobile device 20) may correspond to a main screen, and a user interface screen 1030 of the image forming apparatus A 705 (the image forming apparatus 60) may correspond to a sub-screen.

Either a main screen or a sub-screen may be determined by the control unit 210 included in the mobile device 20 or the control unit 610 included in the image forming apparatus 60.

Referring to FIG. 10, the user interface screen 1030 of the image forming apparatus A 705 (the image forming apparatus 60) corresponds to a sub-screen, and thus, it has a screen layout in which relatively simple menus are included. For example, a copy menu, a fax menu, or a scan menu corresponding to upper menus provided on an image job application may be displayed as short cuts in the user interface screen 1030.

On the other hand, the user interface screen 1010 of the mobile device B 703 (the mobile device 20) corresponds to a main screen and thus has a screen layout having relatively detailed menus. That is, lower menus or sub-menus included in the upper menu provided on an image job application may be displayed on the user interface screen 1010. For example, if a short cut indicating a copy menu is selected via the user interface screen 1030, lower menus or the sub-menus, or specific option setups of the copy menu (setup for colors, the number of copies, or the like) may be displayed on the user interface screen 1010.

Meanwhile, unlike the user interface screen 930 of the image forming apparatus A 705 (the image forming apparatus 60) illustrated in FIG. 9 and described before, the user interface screen 1030 of the image forming apparatus A 705 (the image forming apparatus 60) illustrated in FIG. 10 is described as corresponding to a sub-screen. That is, even for only the image forming apparatus A 705 (the image forming apparatus 60), a main screen or a sub-screen may be determined relatively according to types of NFC devices that are tagged by the image forming apparatus A 705 (the image forming apparatus 60).

Figure 11:
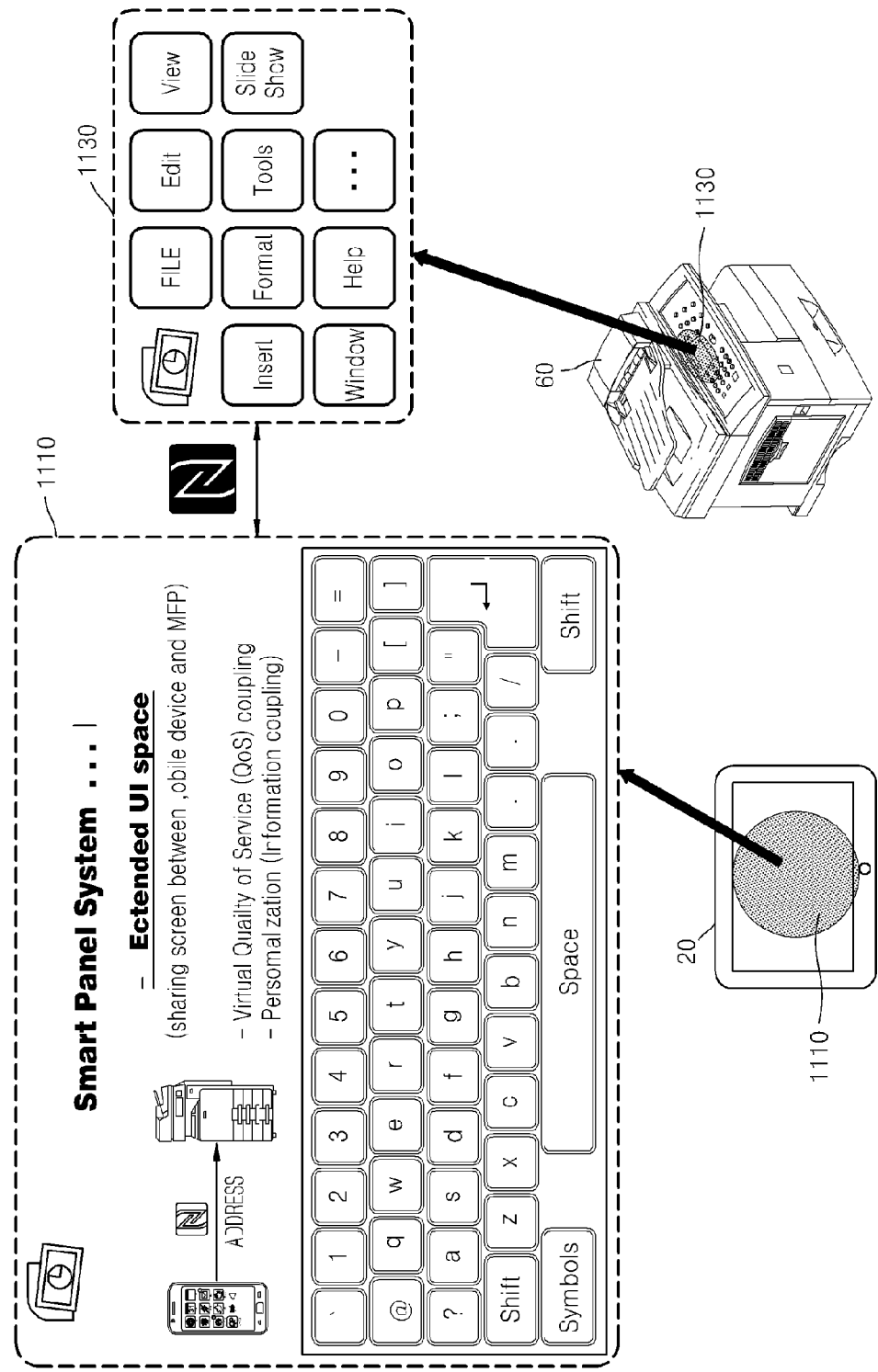
FIG. 11 illustrates a mobile device and an image forming apparatus that provide an extended UI screen regarding a text editing application, according to an embodiment of the present disclosure.

FIG. 11 illustrates a mobile device 20 and an image forming apparatus 60 that provide an extended UI screen regarding a text editing application, according to an embodiment of the present disclosure.

Referring to FIG. 11, it may be assumed that the mobile device 20 corresponds to the mobile device B 703 of FIG. 7, and the image forming apparatus 60 corresponds to the image forming apparatus B 707 of FIG. 7.

As illustrated in FIG. 7 above, a display size of the mobile device B 703 (10.1 inches) is larger than a display size of the image forming apparatus B 707 (3.3 inches), and thus, a user interface screen 1110 of the mobile device B 703 (the mobile device 20) may correspond to a main screen, and a user interface screen 1130 of the image forming apparatus B 707 (the image forming apparatus 60) may correspond to a sub-screen.

Either a main screen or a sub-screen may be determined by the control unit 210 included in the mobile device 20 or the control unit 610 included in the image forming apparatus 60. The control unit 210 of the mobile device 20 or the control unit 610 of the image forming apparatus 60 may consider not only a display size but also characteristics of a text editing application. For example, the control unit 210 or 610 may determine the user interface screen 1110 or 1130 as a main screen, where a text editing window may be displayed so as to allow easy text editing. For example, if a display size is relatively large but graphic processing performance is poor, even if a display size is relatively small, a device having superior graphic processing performance may be determined as corresponding to a main screen. That is, it will be apparent to one of ordinary skill in the art that the current embodiment of the present disclosure is not limited to product specifications of a predetermined product but various usage environments may be considered.

Referring to FIG. 11, the user interface screen 1130 of the image forming apparatus B 707 (the image forming apparatus 60) corresponds to a sub-screen, and thus, it has a screen layout having relatively simple menus. For example, a File menu, an Edit menu, a View menu, an Insert menu, etc. corresponding to upper menus provided on a text editing application (e.g., PowerPoint by Microsoft) may be displayed as shortcuts on the user interface screen 1130.

Meanwhile, the user interface screen 1110 of the mobile device B 703 (the mobile device 20) corresponds to a main screen, and thus, it has a screen layout in which relatively detailed menus or a text editing window (a text editing area or a text editing window) are included. That is, a text editing window provided on a text editing application (e.g., PowerPoint by Microsoft) and a soft keyboard for character input may be displayed on the user interface screen 1110.

Furthermore, for example, if a user has clicked an Insert menu on the user interface screen 1130 in order to insert a figure into a document, a list of figures which may be inserted may be displayed on the user interface screen 1110.

That is, the user interface screen 1110 and the user interface screen 1130 may operate while being linked to each other. Although not shown in the drawing, FIG. 12 illustrates a mobile device 20 and an image forming apparatus 60 that provide an extended UI screen regarding a text editing application to edit a document received from an external server 62(See FIG. 6), according to another embodiment of the present disclosure.

Figure 12:
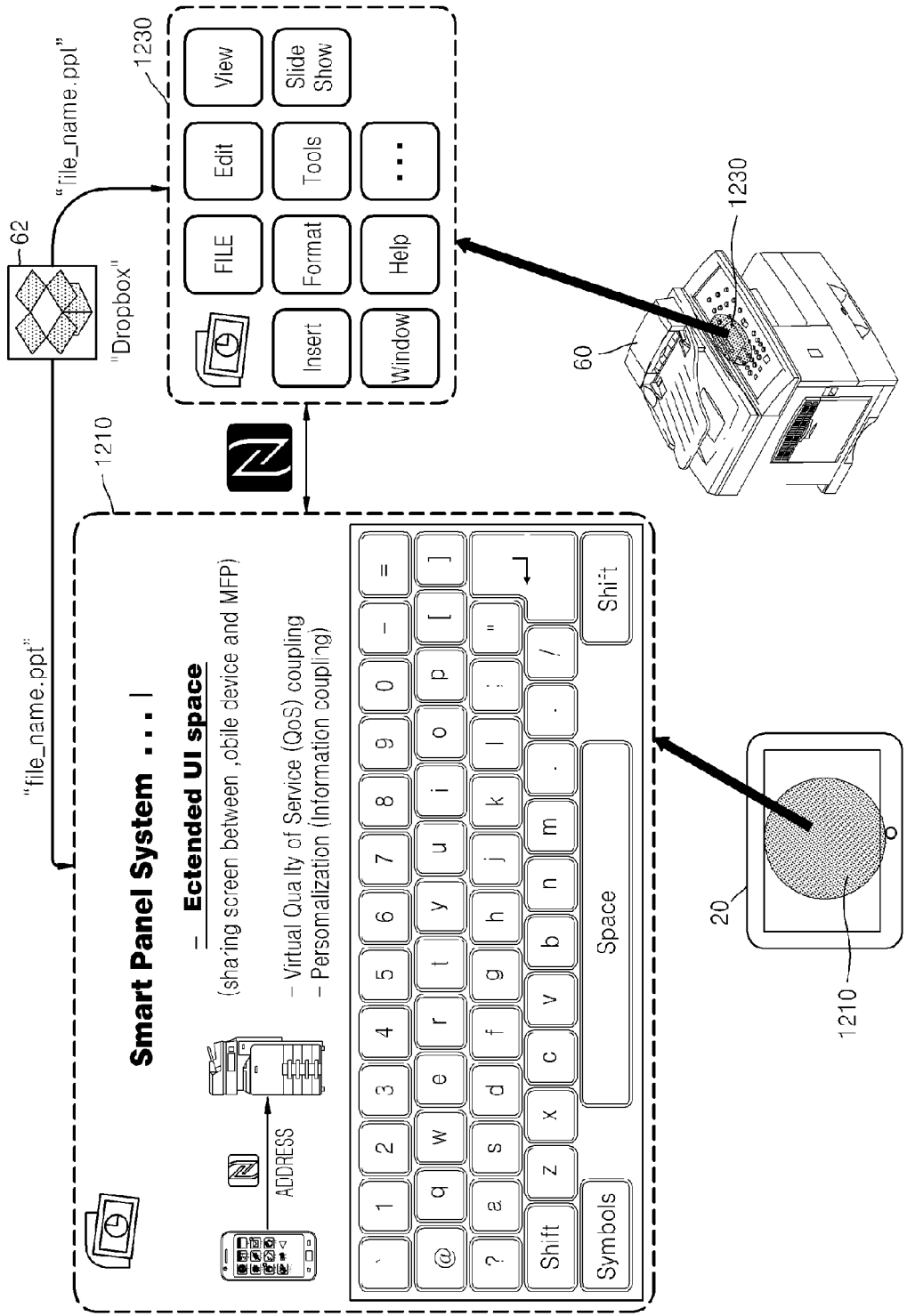
FIG. 12 illustrates a mobile device and an image forming apparatus that provide an extended UI screen regarding a text editing application for editing a document received from an external server, according to another embodiment of the present disclosure.

Referring to FIG. 12, the external server 62 may correspond to the external server 62 illustrated in FIG. 6, and the external server 62 may correspond to a server that provides a cloud service. For example, the external server 62 may correspond to a cloud service that is currently widely used, such as Dropbox or GoogleDrive.

Functions and operations of the mobile device 20 and the image forming apparatus 60 illustrated in FIG. 12 are similar to those of FIG. 11, and thus, repeated description thereof is omitted.

However, the mobile device 20 and the image forming apparatus 60 illustrated in FIG. 12 may simultaneously download a predetermined document file (file_name.ppt) via the network interface unit 240 or 640 of FIG. 6 from the external server 62 (Dropbox) and may perform text editing via user interface screens 1210 or 1230, as has been described above with reference to FIG. 11.

Figure 13:
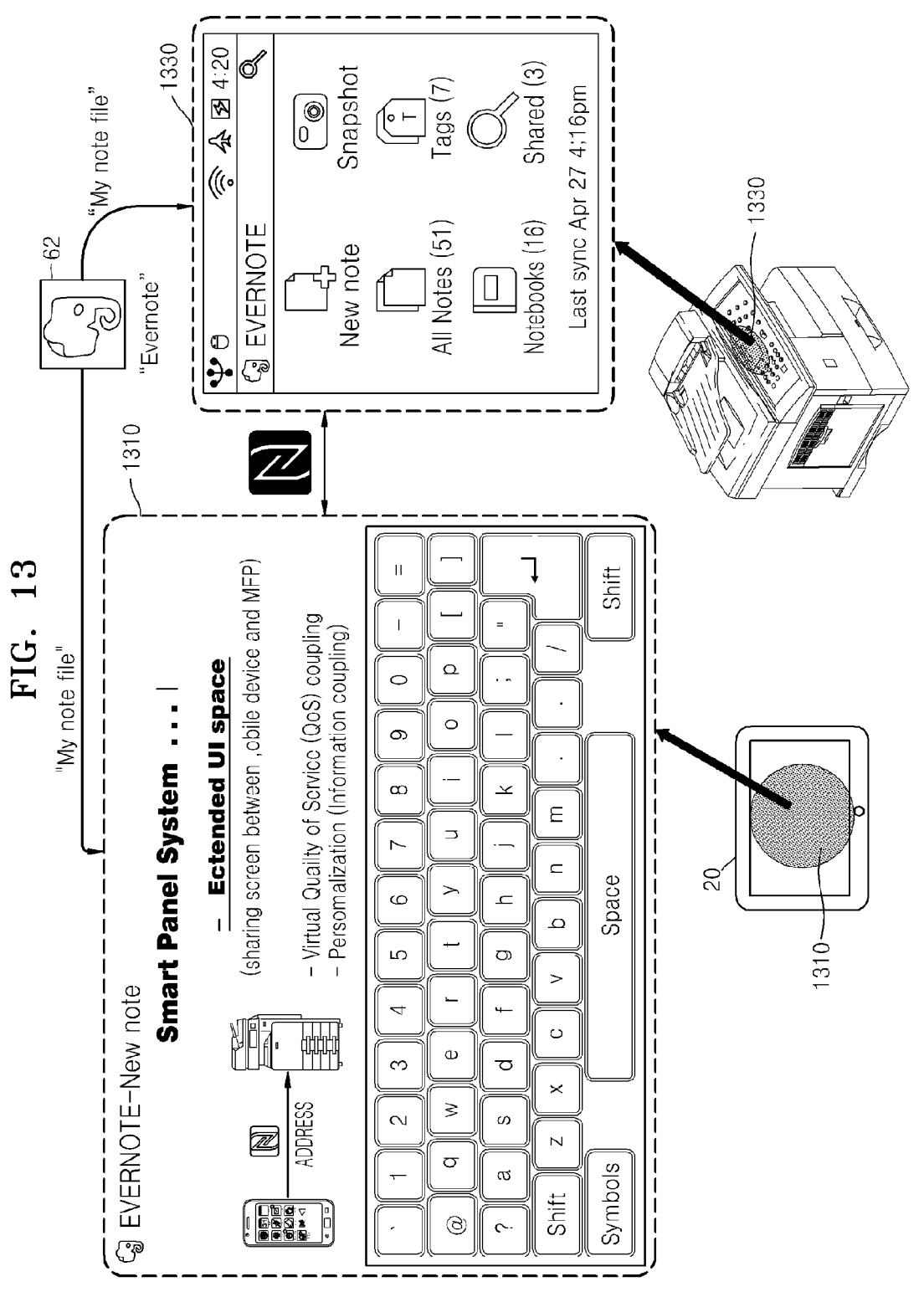

FIG. 13 illustrates a mobile device 20 and an image forming apparatus 60 that provide an extended UI screen regarding a text editing application to edit a document received from an external server 62, according to another embodiment of the present disclosure.

Referring to FIG. 13, the external server 62 may correspond to the external server 62 illustrated in FIG. 6, and the external server 62 may correspond to a server that provides a contents service. For example, the external server 62 may correspond to a service provider that provides contents such as a schedule, notes, photo sharing, or a social networking service (SNS) that is currently widely used, such as Dropbox or GoogleDrive. However, while the external server 62 in FIG. 13 is assumed as a server providing Evernote service, the embodiment of the present disclosure is not limited thereto.

The mobile device 20 and the image forming apparatus 60 illustrated in FIG. 13 may simultaneously download a predetermined contents file (My note file) via the network interface unit 240 or 640 of FIG. 6 from the external server 62 (Evernote) and perform composition or watching of contents via user interface screens 1310 or 1330.

Also, it may be assumed that the mobile device 20 corresponds to the mobile device B 703 of FIG. 7, and the image forming apparatus 60 corresponds to the image forming apparatus B 707 of FIG. 7.

As illustrated in FIG. 7 above, a display size of the mobile device B 703 (10.1 inches) is larger than a display size of the image forming apparatus B 707 (3.3 inches), and thus, the user interface screen 1210 of the mobile device B 703 (the mobile device 20) may correspond to a main screen, and the user interface screen 1330 of the image forming apparatus B 707 (the image forming apparatus 60) may correspond to a sub-screen.

Referring to FIG. 13, the user interface screen 1330 of the image forming apparatus B 707 (the image forming apparatus 60) corresponds to a sub-screen, and thus, it has a screen layout having relatively simple menus. For example, a New note menu, a Snapshot menu, an All notes menu, a Tags menu, etc. corresponding to upper menus provided on the Evernote application may be displayed as short cuts on the user interface screen 1330.

Meanwhile, the user interface screen 1310 of the mobile device B 703 (the mobile device 20) corresponds to a main screen, and thus, it has a screen layout having relatively detailed menus or specific memo windows (contents operation window). Also, the user interface screen 1310 may also display a soft keyboard for character input.

Meanwhile, description with reference to FIGS. 9 through 13 relates to examples to which embodiments of the present disclosure may be applied. Besides, the current embodiment may also be applied to an example where an extended UI screen is configured such that a user interface screen requiring security corresponds to a sub-screen having a relatively small display size and a user interface screen that does not require security corresponds to a main screen having a relatively large display size. That is, it will be apparent to one of ordinary skill in the art that a function of providing an extended UI screen of the mobile device 20 and the image forming apparatus 60 may also be implemented in other various forms not illustrated in FIGS. 9 through 13.

Figure 14:
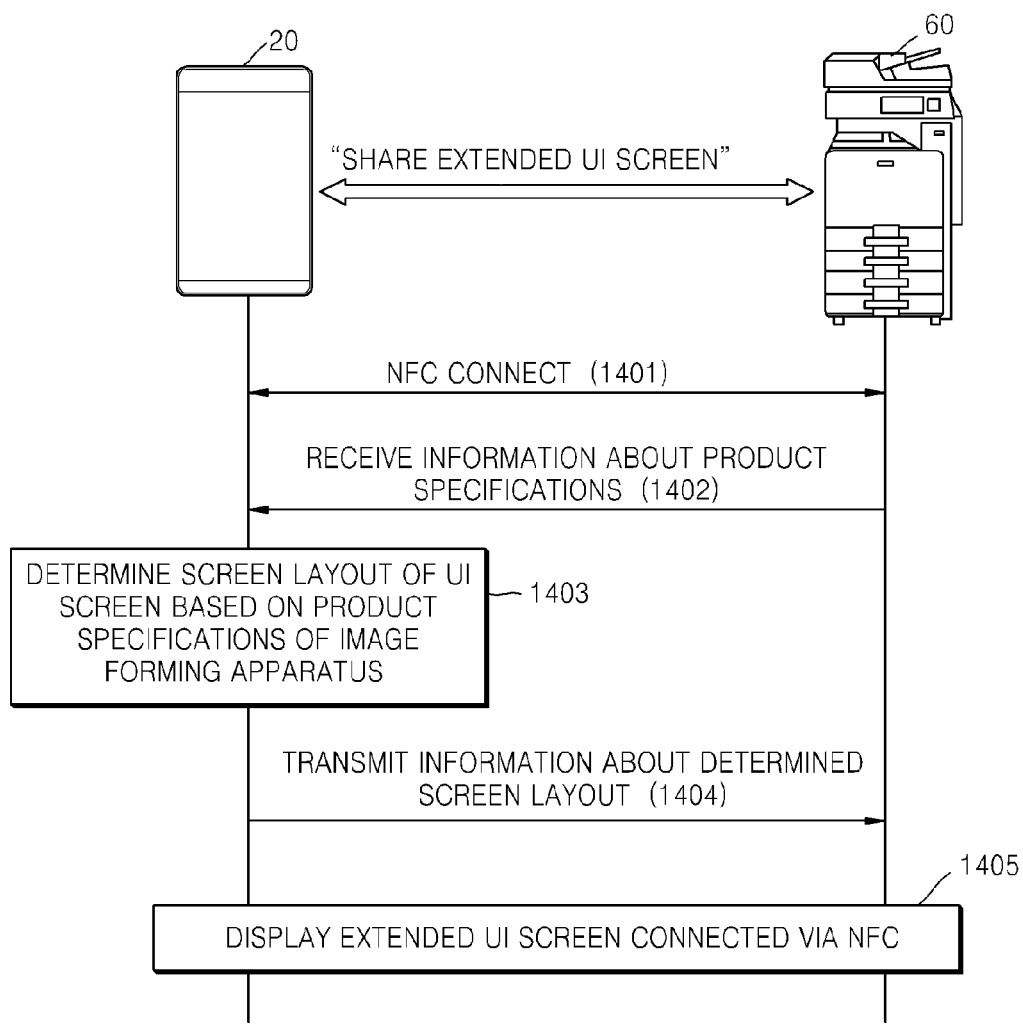
FIG. 14 is a diagram for explaining an operation of providing an extended UI screen in a mobile device, according to an embodiment of the present disclosure.

FIG. 14 is a diagram for explaining an operation of providing an extended UI screen in a mobile device 20, according to an embodiment of the present disclosure. The operation of providing an extended UI screen of FIG. 14 corresponds to operations that are processed in the image forming apparatus 60 and the mobile device 20 illustrated in FIG. 6, and thus, even details that are omitted below but described above with reference to FIG. 6 above may also be applied to the operation of providing an extended UI screen of FIG. 14.

In operation 1401, the NFC module 220 of the mobile device 20 detects access of the image forming apparatus 60 according to an NFC protocol. Accordingly, the NFC module 220 of the mobile device 20 completes authentication of the image forming apparatus 60 by transmitting or receiving an NDEF message defined according to the NFC standards to or from the NFC module 620 of the image forming apparatus 60, and thus, tagging between the mobile device 20 and the image forming apparatus 60 is completed via NFC.

In operation 1402, when the image forming apparatus 60 is tagged via NFC, the NFC module 220 of the mobile device 20 receives information about product specifications of the image forming apparatus 60.

In operation 1403, the control unit 210 of the mobile device 20 determines a screen layout of a second user interface screen of the mobile device 20 with respect to a predetermined application based on the product specifications of the image forming apparatus 60. Also, the control unit 210 may also determine a screen layout of a first user interface screen of the image forming apparatus 60.

In detail, the determining unit 2101 of the control unit 210 compares the product specifications of the mobile device 20 (e.g., the product specifications of the mobile device A 701 or the mobile device B 703 of FIG. 7) and the product specifications of the image forming apparatus 60 (the product specifications of the image forming apparatus A 705 or the image forming apparatus B 707 of FIG. 7). Then, the determining unit 2101 determines which of the mobile device 20 and the image forming apparatus 60 is a device having superior or inferior product specifications.

The screen layout unit 2102 of the control unit 210 determines a screen layout of a second user interface screen of the mobile device 20 based on a determination result of the determining unit 2101. That is, the screen layout unit 2102 determines whether a second user interface screen of the mobile device 20 is to be a screen layout corresponding to a main screen or a screen layout corresponding to a sub-screen, with respect to an image job application, a text editing application, or a contents providing application, for example.

Also, the screen layout unit 2102 may also determine a screen layout of a first user interface screen of the image forming apparatus 60 based on a determination result.

In operation 1404, the NFC module 220 of the mobile device 20 transmits information about a screen layout determined with respect to the first user interface screen of the image forming apparatus 60, to the image forming apparatus 60.

In operation 1405, the user interface unit 230 of the mobile device 20 displays a second user interface screen having a screen layout determined by the control unit 210 before, with respect to predetermined applications such as an image job application, a text editing application, a contents providing application, which may be executed on the mobile device 20. Also, the user interface unit 630 of the image forming apparatus 60 displays a first user interface screen having a screen layout determined by the control unit 210 before, with respect to the above applications.

Figure 15:
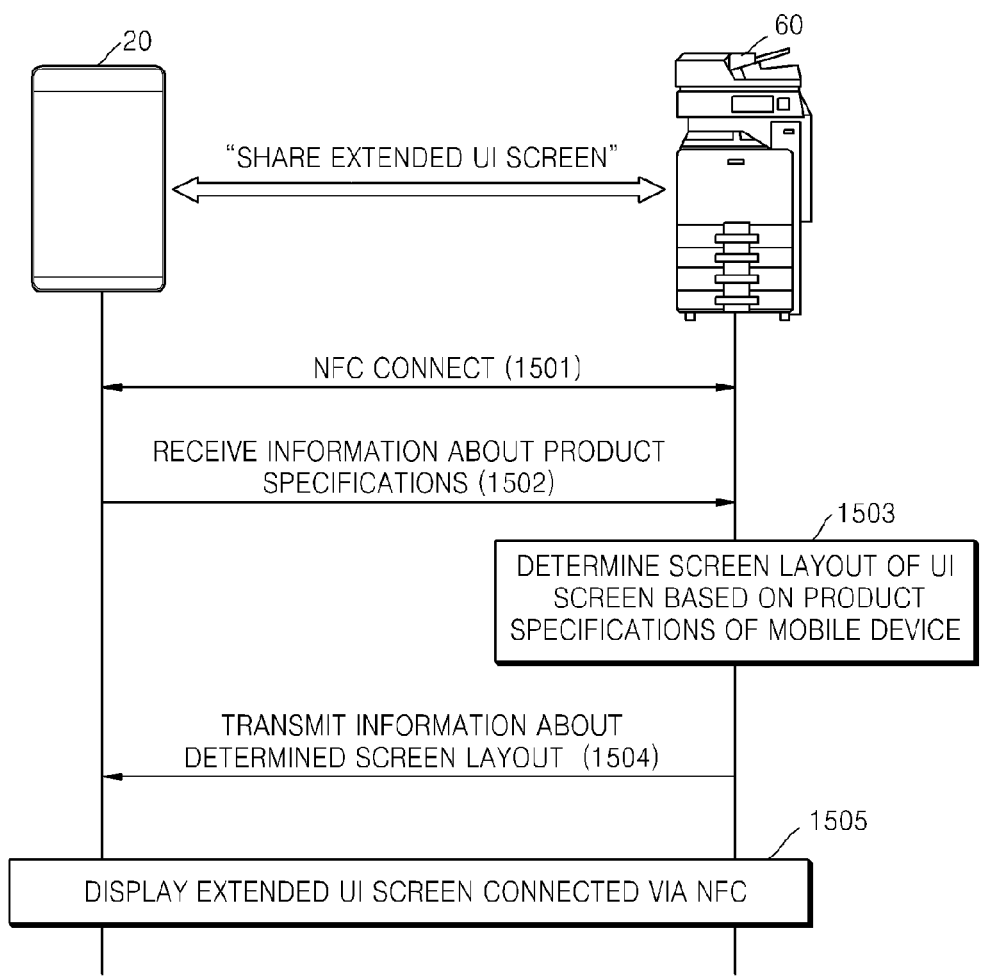
FIG. 15 is a diagram for explaining an operation of providing an extended UI screen in an image forming apparatus, according to an embodiment of the present disclosure.

FIG. 15 is a diagram for explaining an operation of providing an extended UI screen in an image forming apparatus 60, according to an embodiment of the present disclosure. The operation of providing an extended UI screen of FIG. 15 corresponds to operations that are processed in the image forming apparatus 60 and the mobile device 20 illustrated in FIG. 6, and thus, even details that are omitted below but described above with reference to FIG. 6 above may also be applied to the operation of providing an extended UI screen of FIG. 15.

In operation 1501, the NFC module 620 of the image forming apparatus 60 detects access of the image forming apparatus 60 according to an NFC protocol. Accordingly, the NFC module 220 of the image forming apparatus 60 completes authentication of the mobile device 20 by transmitting or receiving an NDEF message defined according to the NFC standards to or from the NFC module 220 of the mobile device 20, and thus, tagging between the mobile device 20 and the image forming apparatus 60 is completed via NFC.

In operation 1502, when the mobile device 20 is tagged via NFC, the NFC module 620 of the image forming apparatus 60 receives information about the product specifications of the mobile device 20.

In operation 1503, the control unit 610 of the image forming apparatus 60 determines a screen layout of a first user interface screen of the image forming apparatus 60 with respect to a predetermined application based on the product specifications of the mobile device 20. Also, the control unit 610 may determine a screen layout of a second user interface screen of the mobile device 20.

In detail, the determining unit 6101 of the control unit 610 compares the product specifications of the mobile device 20 (for example, the product specifications of the mobile device A 701 or of the mobile device B 703 of FIG. 7) and the product specifications of the image forming apparatus 60 (for example, the product specifications of the image forming apparatus A 705 or of the image forming apparatus B 707 of FIG. 7). Then, the determining unit 6101 determines which of the mobile device 20 and the image forming apparatus 60 has either superior or inferior product specifications.

The screen layout unit 6102 of the control unit 610 determines a screen layout of a first user interface screen of the image forming apparatus 60 based on a determination result of the determining unit 6101. That is, the screen layout unit 6102 determines whether the first user interface screen of the image forming apparatus 60 is to be a screen layout corresponding to a main screen or a screen layout corresponding to a sub-screen, with respect to an image job application, a text editing application, a contents providing application, or the like.

Also, the screen layout unit 6102 may also determine a screen layout of a second user interface screen of the mobile device 20 based on a determination result.

In operation 1504, the NFC module 620 of the image forming apparatus 60 transmits information about a screen layout determined with respect to a second user interface screen of the mobile device 20, to the mobile device 20.

In operation 1505, the user interface unit 630 of the image forming apparatus 60 displays a first user interface screen having a screen layout determined by the control unit 610 before, with respect to predetermined applications such as an image job application, a text editing application, a contents providing application, which may be executed on the mobile device 20. Also, the user interface unit 230 of the mobile device 20 displays a second user interface screen having a screen layout determined by the control unit 210 before, with respect to the above applications.

FIG. 16 is a flowchart illustrating a method of providing an extended UI screen in a mobile device 20, according to an embodiment of the present disclosure. The method of providing an extended UI screen of FIG. 16 corresponds to operations that are processed in the image forming apparatus 60 and the mobile device 20 illustrated in FIG. 6, and thus, even details that are omitted below but described above with reference to FIG. 6 above may also be applied to the method of providing an extended UI screen of FIG. 16.

In operation 1601, when the image forming apparatus 60 is tagged via NFC, the NFC module 220 receives information about the product specifications of the image forming apparatus 60.

In operation 1602, the control unit 210 of the mobile device 20 determines a screen component of a second user interface screen of the mobile device 20 which operates while being linked to a first user interface screen of the image forming apparatus 60 with respect to a predetermined application, based on the product specifications of the image forming apparatus 60.

In operation 1603, the user interface unit 630 displays a second user interface screen having a screen layout determined with respect to a predetermined application.

FIG. 17 is a flowchart illustrating a method of providing an extended UI screen in an image forming apparatus 60, according to an embodiment of the present disclosure. The method of providing an extended UI screen of FIG. 17 corresponds to operations that are processed in time series in the image forming apparatus 60 and the mobile device 20 illustrated in FIG. 6, and thus, even details that are omitted below but described above with reference to FIG. 6 above may also be applied to the method of providing an extended UI screen of FIG. 17.

In operation 1701, when the mobile device 20 is tagged via NFC, the NFC module 620 receives information about the product specifications of the mobile device 20.

In operation 1702, the control unit 610 determines a screen layout of a first user interface screen of the image forming apparatus 60 which operates while being linked to a second user interface screen of the mobile device 20 with respect to a predetermined application, based on the product specifications of the mobile device 20.

In operation 1703, the user interface unit 630 displays a first user interface screen having a screen layout determined with respect to a predetermined application.

According to the exemplary embodiments of the present general inventive concept, when NFC devices having an NFC function are tagged via NFC, a user interface screen of a predetermined NFC device may also be extended to another NFC device. Thus, even if an NFC device has a narrow or small user interface screen, an operation may be easily performed via a relatively wide user interface screen included in the another NFC device.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM disks, DVDs and Blu-rays; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

While this present general inventive concept has been particularly illustrated and described with reference to exemplary embodiments thereof, it will be appreciated by those of ordinary skill in the art that changes may be made in these exemplary embodiments without departing from the principles and spirit of the present general inventive concept, the scope of which is defined in the appended claims and their equivalents. The exemplary embodiments should be considered in descriptive sense only and not for purposes of limitation. Therefore, the scope of the present general inventive concept is defined not by the detailed description of the present general inventive concept but by the appended claims, and all differences within the scope will be construed as being included in the present general inventive concept.

What is claimed is:

1. A mobile device for providing a user interface, the mobile device comprising:

a near field communication (NFC) module to receive a display specification of an image forming apparatus when the image forming apparatus is tagged via NFC;

a controller to determine a first layout of a first user interface of the image forming apparatus and a second layout of a second user interface of the mobile device by comparing a display specification of the mobile device and the received display specification of the image forming apparatus; and a user interface unit to display the second user interface of the mobile device having the determined second layout, wherein the controller determines one of the first user interface and the second user interface as a main interface and another of the first user interface and the second user interface as a sub-interface based on a result of the comparing, wherein the main interface comprises more detailed user interface configurations than the sub-interface, and wherein if an activation command of an upper menu is input via the sub-interface, a lower menu related to the upper menu is displayed on the main interface.

2. The mobile device of claim 1, wherein the second user interface is extended from the first user interface.

3. The mobile device of claim 1, wherein the first user interface and the second user interface have different layouts.

4. The mobile device of claim 1, wherein the user interface unit displays the second user interface of the mobile device based on job information that is input via the first user interface which is displayed on the image forming apparatus.

5. The mobile device of claim 1, wherein if the activation command of the upper menu is input via the first user interface of the image forming apparatus, then a corresponding command is received via the NFC module of the mobile device, and the user interface unit of the mobile device displays the lower menu, which is related to the corresponding command, of the upper menu displayed on the second user interface of the mobile device.

6. The mobile device of claim 1, wherein the controller is configured to:

determine one of the mobile device and the image forming apparatus has superior display specifications by comparing the display specification of the mobile device and the received display specification of the image forming apparatus, and determine the second layout of the second user interface of the mobile device based on a result of the determination.

7. The mobile device of claim 6, wherein the controller determines one of the mobile device and the image forming apparatus is superior by further considering at least one of: a type of an application to be executed on the mobile device, a type of an application to be executed on the image forming apparatus, types of contents to be processed in the application to be executed on the image forming apparatus, and types of contents to be processed in the application to be executed on the mobile device, in addition to the display specifications.

8. The mobile device of claim 1, wherein the received display specification of the image forming apparatus and the display specification of the mobile device both further comprise at least one of a display size and a display resolution.

9. The mobile device of claim 8, wherein the controller determines a layout of the first user interface by of the image forming apparatus by comparing a display size of the image forming apparatus that is included in the received display specification.

10. The mobile device of claim 1, wherein the controller executes an image job application, and the user interface unit displays, on the second user interface of the mobile device, menus that are not included on the first user interface that is transmitted to the image forming apparatus, among menus of an upper menu and menus of a lower menu of the image job application.

11. The mobile device of claim 1, wherein the controller executes a text editing application, and the user interface unit displays, if a text editing window of the text editing application is not included in the first layout of the first user interface that is transmitted to the image forming apparatus, the text editing window is included on the second user interface.

12. The mobile device of claim 1, wherein the controller executes an application that provides contents, and the user interface unit displays, if specific contents of the application are not displayed on the first user interface, the specific contents on the second user interface.

13. The mobile device of claim 1, wherein the second user interface of the mobile device is linked to the first user interface of the image forming apparatus with respect to a predetermined application, and the user interface unit displays the second user interface having the layout determined with respect to the predetermined application.

14. An image forming apparatus for providing a user interface, the image forming apparatus comprising:
  a near field communication (NFC) module to receive a display specification of a mobile device when the mobile device is tagged via NFC;
  a controller to determine a first layout of a first user interface of the image forming apparatus and a second layout of a second user interface of the mobile device by comparing a display specification of the image forming apparatus and the received display specification of the mobile device; and
  a user interface unit to display the first user interface of the image forming apparatus having the determined first layout,
  wherein the controller determines one of the first user interface and the second user interface as a main interface and another of the first user interface and the second user interface as a sub-interface based on a result of the comparing,
  wherein the main interface comprises more detailed user interface configurations than the sub-interface, and
  wherein if an activation command of an upper menu is input via the sub-interface, a lower menu related to the upper menu is displayed on the main interface.

15. The image forming apparatus of claim 14, wherein the user interface unit displays the first user interface of the image forming apparatus based on job information input via the second user interface of the mobile device.

16. The image forming apparatus of claim 15, wherein when the activation command of the upper menu that is input via the second user interface of the mobile device is received via the NFC module of the image forming apparatus, the user interface unit displays lower menus of the upper menu displayed on the first user interface of the image forming apparatus.

17. The image forming apparatus of claim 14, wherein the controller is configured to determine a superior device among the mobile device and the image forming apparatus by comparing the received display specification of the mobile device and a display specification of the image forming apparatus, and
determine the layout of the first user interface based on a result of the determining of the superior device.

18. A method of providing a user interface in a mobile device, the method comprising:
  receiving information about display specification of an image forming apparatus when the image forming apparatus is tagged via near field communication (NFC);
  determining a first layout of a first user interface of the image forming apparatus and a second layout of a second user interface of the mobile device by comparing a display specification of the mobile device and the received display specification of the image forming apparatus;
  displaying the second user interface having the determined second layout on the mobile device; and
  providing the first user interface, which is displayable, having the determined first layout to the image forming apparatus using NFC,
  wherein the determining of the first layout and the second layout comprises determining one of the first user interface and the second user interface as a main interface and another of the first user interface and the second user interface as a sub-interface based on a result of the comparing,
  wherein the main interface comprises more detailed user interface configurations than the sub-interface, and
  wherein if an activation command of an upper menu is input via the sub-interface, a lower menu related to the upper menu is displayed on the main interface.

19. A method of providing a user interface in an image forming apparatus, the method comprising:
  receiving information about display specification of a mobile device when the mobile device is tagged via near field communication (NFC);
  determining a first layout of a first user interface of the image forming apparatus and a second layout of a second user interface of the mobile device by comparing a display specification of the image forming apparatus and the received display specification of the mobile device;
  displaying the first user interface having the determined first layout on the image forming apparatus; and
  providing the second user interface, which is displayable, having the determined second layout to the mobile device using NFC,
  wherein the determining of the first layout and the second layout comprises determining one of the first user interface and the second user interface as a main interface and another of the first user interface and the second user interface as a sub-interface based on a result of the comparing, and
  wherein the main interface comprises more detailed user interface configurations than the sub-interface, and
  wherein if an activation command of an upper menu is input via the sub-interface, a lower menu related to the upper menu is displayed on the main interface.

20. A non-transitory computer-readable recording medium having embodied thereon a program to execute the method of claim 18.

* * * * *